(12) United States Patent
Park et al.

(10) Patent No.: US 9,398,577 B2
(45) Date of Patent: Jul. 19, 2016

(54) TRANSMISSION AND RECEPTION OF CONTROL INFORMATION

(71) Applicant: KT CORPORATION, Gyeonggi-do (KR)

(72) Inventors: Kyu Jin Park, Seoul (KR); Woo-Jin Choi, Seoul (KR)

(73) Assignee: KT CORPORATION, Gyeonggi-do (KR)

( * ) Notice: Subject to any disclaimer, the term of this patent is extended or adjusted under 35 U.S.C. 154(b) by 417 days.

(21) Appl. No.: 14/027,639

(22) Filed: Sep. 16, 2013

(65) Prior Publication Data

US 2014/0078987 A1  Mar. 20, 2014

(30) Foreign Application Priority Data

Sep. 18, 2012 (KR) .................. 10-2012-0103584
Dec. 13, 2012 (KR) .................. 10-2012-0145368

(51) Int. Cl.
*H04W 72/04* (2009.01)
*H04L 5/00* (2006.01)

(52) U.S. Cl.
CPC ........... *H04W 72/042* (2013.01); *H04L 5/0053* (2013.01)

(58) Field of Classification Search
CPC ... H04W 72/042; H04W 72/00; H04W 48/12; H04W 72/0446; H04L 5/0053
USPC .......................................... 370/329, 330, 336
See application file for complete search history.

(56) References Cited

U.S. PATENT DOCUMENTS

| | | | |
|---|---|---|---|
| 9,173,215 B2 * | 10/2015 | Park | H04L 5/0053 |
| 2011/0312363 A1 | 12/2011 | Kolding et al. | |
| 2012/0002740 A1 | 1/2012 | Han et al. | |
| 2012/0220327 A1 | 8/2012 | Lee et al. | |
| 2013/0194931 A1 * | 8/2013 | Lee | H04L 5/0053 370/241 |
| 2013/0242882 A1 * | 9/2013 | Blankenship | H04W 72/0453 370/329 |
| 2013/0272214 A1 * | 10/2013 | Zhu | H04W 28/02 370/329 |
| 2013/0301562 A1 * | 11/2013 | Liao | H04W 72/042 370/329 |
| 2014/0036810 A1 | 2/2014 | Harrison et al. | |
| 2014/0078987 A1 | 3/2014 | Park et al. | |
| 2014/0293957 A1 * | 10/2014 | Chun | H04L 5/0041 370/330 |
| 2014/0355451 A1 | 12/2014 | Kim et al. | |
| 2015/0003349 A1 | 1/2015 | Kim et al. | |

(Continued)

FOREIGN PATENT DOCUMENTS

JP  2014-023108 A  2/2014

OTHER PUBLICATIONS

Panasonic, 3GPP TSG RAN WG1 Meeting #70, Qingdo, China, Aug. 13-17, 2012.*

(Continued)

*Primary Examiner* — Charles C Jiang
*Assistant Examiner* — Will Lin
(74) *Attorney, Agent, or Firm* — IP Legal Services, LLC

(57) ABSTRACT

The disclosure is related to transmitting control information in a transmission/reception point and to receiving the control information in user equipment. Particularly, the present disclosure relates to transmitting the control information for user equipment which receives downlink control information through a downlink control channel newly defined in a data region. Furthermore, the present disclosure relates to performing a resource mapping for enhanced control channel elements (ECCEs) of an enhanced physical downlink control channel (EPDCCH).

20 Claims, 11 Drawing Sheets

(56) References Cited

U.S. PATENT DOCUMENTS

| | | | |
|---|---|---|---|
| 2015/0085773 A1* | 3/2015 | Seo | H04W 72/042 370/329 |
| 2015/0139109 A1 | 5/2015 | Seo et al. | |
| 2015/0146639 A1* | 5/2015 | Seo | H04L 5/0094 370/329 |
| 2015/0181569 A1* | 6/2015 | Kim | H04B 7/02 370/329 |
| 2015/0181573 A1 | 6/2015 | Takeda et al. | |
| 2015/0229455 A1 | 8/2015 | Seo et al. | |
| 2016/0037498 A1 | 2/2016 | Chen et al. | |

OTHER PUBLICATIONS

Korean Intellectual Property Office, International Search Report for International Application No. PCT/KR2013/008191, Dec. 23, 2013.

Korean Intellectual Property Office, Written Opinion of the International Searching Authority for International Application No. PCT/KR2013/008191, Dec. 23, 2013.

Mediatek Inc., "Necessity of Multiplexing of Localized and Distributed ePDCCH Parts in the Same PRBs", R1-122168, 3GPP TSG RAN WG1 #69, Prague, Czech Republic, May 21-25, 2012, pp. 1-3.

Panasonic, "RE mapping for ePDCCH", R1-123287, 3GPP TSG RAN WG1 Meeting #70, Qingdao, China, Aug. 13-17, 2012, pp. 1-8.

NEC Group, "ePDCCH search space design", R1-123253, 3GPP TSG RAN WG1 Meeting #70, Qingdao, China, Aug. 13-17, 2012, pp. 1-6.

Renesas Mobile Europe Ltd., "Remaining details on ePDCCH antenna port association", R1-123587, 3GPP TSG RAN WG1 Meeting #70, Qingdao, China, May 13-17, 2012, pp. 1-6.

Fujitsu, "Definition of eREG and eCCE", R1-122068, 3GPP TSG RAN WG1 Meeting #69, Prague, Czech Republic, May 21-25, 2012, pp. 1-4.

Interdigital Communications, LLC, "On ePDCCH Multiplexing", R1-121319, 3GPP TSG RAN WG1 Meeting #68bis, Jeju, Korea, Mar. 26-30, 2012, pp. 1-5.

Korean Intellectual Property Office, International Search Report for International Application No. PCT/KR2013/008329, Dec. 27, 2013.

Korean Intellectual Property Office, Written Opinion of the International Searching Authority for International Application No. PCT/KR2013/008329, Dec. 27, 2013.

\* cited by examiner

TRANSMISSION AND RECEPTION OF CONTROL INFORMATION

CROSS REFERENCE TO PRIOR APPLICATIONS

The present application claims priority under 35 U.S.C. §119 to Korean Patent Application No. 10-2012-0103584 (filed on Sep. 18, 2012) and Korean Patent Application No. 10-2012-0145368 (filed on Dec. 13, 2012), which are hereby incorporated by reference in their entirety.

BACKGROUND

The present disclosure relates to transmitting control information in a transmission/reception point and to receiving the control information in user equipment. Particularly, the present disclosure relates to a method and an apparatus (e.g., a transmission/reception point) for transmitting control information for user equipment which receives downlink control information through a downlink control channel newly adopted (or defined) in a data region. Furthermore, the present disclosure relates to a method and an apparatus (e.g., user equipment) for receiving the control information.

A wireless communication system has been designed to transmit a mass amount of data to many subscribers. However, it is difficult to increase the capacity of the wireless communication system due to the limited resources of a control region. In order to overcome such limitation, use of a downlink control channel located in a data region might be required in order to transmit downlink control information.

Meanwhile, typical control channel elements (CCEs) are associated with assignment of a downlink control channel in a control region. Enhanced control channel elements (ECCEs) are newly defined for assigning the downlink control channel in a data region. Accordingly, a resource assignment scheme associated with the newly-defined ECCEs might be required.

SUMMARY

The present embodiment is to provide an enhanced control channel element ECCE)/enhanced resource element group (EREG) mapping method for a downlink control channel transmission in a data region. Furthermore, the present embodiment is to provide a method and an apparatus for performing ECCE indexing in a distributed 'enhanced physical downlink control channel' (EPDCCH) set.

In accordance with at least one embodiment, a method may be provided for transmitting control information to user equipment through data regions of two or more physical resource-block (PRB) pairs in a subframe, in a transmission/reception point. The method may include forming enhanced control channel elements (ECCEs), wherein (i) resource elements (REs) in each of the two or more PRB pairs are indexed by repetitively using 16 numbers according to a frequency-first scheme, (ii) resource elements (REs) having an identical index are included in an identical enhanced resource-element group (EREG), (iii) each of the ECCEs includes 4 or 8 EREGs corresponding to different EREG indices having an identical remainder when the different EREG indices are divided by one of 4 and 2, and (iv) the EREGs included in each of the ECCEs are located in the two or more PRB pairs; and transmitting the control information to the user equipment through at least one of the ECCEs.

In accordance with another embodiment, a method may be provided for receiving control information from a transmission/reception point through data regions of two or more physical resource-block (PRB) pairs in a subframe, in user equipment. The method may include receiving a wireless signal through at least one enhanced control channel element (ECCE), wherein (i) resource elements (REs) in each of the two or more PRB pairs are indexed by repetitively using 16 numbers according to a frequency-first scheme, (ii) resource elements (REs) having an identical index are included in an identical enhanced resource-element group (EREG), (iii) each of ECCEs includes 4 or 8 EREGs corresponding to different EREG indices having an identical remainder when the different EREG indices are divided by one of 4 and 2, and (iv) the EREGs included in each of the ECCEs are located in the two or more PRB pairs; and obtaining the control information from the received wireless signal.

In accordance with still another embodiment, a transmission/reception point may be provided for transmitting control information to user equipment through data regions of two or more physical resource-block (PRB) pairs in a subframe. The transmission/reception point may include a control processor and a transmitter. The control processor may be configured to form enhanced control channel elements (ECCEs). Herein, (i) resource elements (REs) in each of the two or more PRB pairs are indexed by repetitively using 16 numbers according to a frequency-first scheme, (ii) resource elements (REs) having an identical index are included in an identical enhanced resource-element group (EREG), (iii) each of the ECCEs includes 4 or 8 EREGs corresponding to different EREG indices having an identical remainder when the different EREG indices are divided by one of 4 and 2, and (iv) the EREGs included in each of the ECCEs are located in the two or more PRB pairs. The transmitter may be configured to transmit the control information to the user equipment through at least one of the ECCEs.

In accordance with still another embodiment, user equipment may be provided for receiving control information from a transmission point through data regions of two or more physical resource-block (PRB) pairs in a subframe. The user equipment may include a receiver and a control processor. The receiver may be configured to receive a wireless signal through at least one enhanced control channel element (ECCE). Herein, (i) resource elements (REs) in each of the two or more PRB pair are indexed by repetitively using 16 numbers according to a frequency-first scheme, (ii) resource elements (REs) having an identical index are included in an identical enhanced resource-element group (EREG), (iii) each of ECCEs includes 4 or 8 EREGs corresponding to different EREG indices having an identical remainder when the different EREG indices are divided by one of 4 and 2, and (iv) the EREGs included in each of the ECCEs are located in the two or more PRB pairs. The control processor may be configured to obtain the control information from the received wireless signal.

DETAILED DESCRIPTION OF EMBODIMENTS

Figure 1:
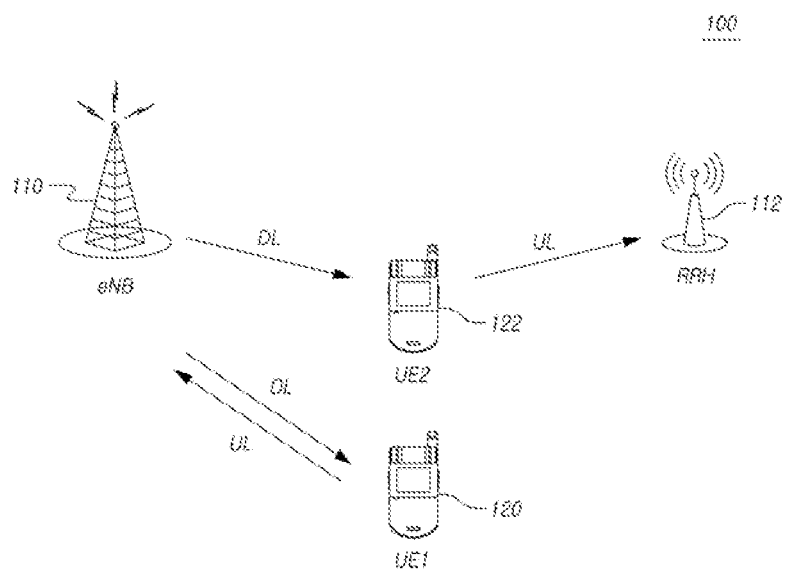
FIG. 1 is an exemplary diagram illustrating a wireless communication system to which at least one embodiment may be applied.

Hereinafter, exemplary embodiments of the present invention will be described with reference to the accompanying drawings. In the following description, the same elements will be designated by the same reference numerals although they are shown in different drawings. Furthermore, in the following description of the present embodiment, a detailed description of known functions and configurations incorporated herein will be omitted when it may make the subject matter of the present embodiment unclear.

A wireless communication system in accordance with at least one embodiment may be widely used in order to provide a variety of communication services such as a voice service, a packet data service, and so forth. The wireless communication system may include user equipment (UE) and at least one transmission/reception point. In the present description, the term "user equipment (UE)" is used as a general concept that includes a terminal in wireless communication. Accordingly, the user equipment (UE) should be construed as a concept that includes a mobile station (MS), a user terminal (UT), a subscriber station (SS), and/or a wireless device in a global system for mobile communications (GSM), as well as user equipment used in wideband code division multiple access (WCDMA), long term evolution (LTE), and/or high speed packet access (HSPA).

The transmission/reception point may indicate a station that communicates with the user equipment. Such a transmission/reception point may be referred to as different terms, for example, a base station (BS), a cell, a Node-B, an evolved Node-B (eNB), a sector, a site, a base transceiver system (BTS), an access point (AP), a relay node (RN), a remote radio head (RRH), a radio unit (RU), and the like.

That is, in the present description, the base station (BS) or the cell may be construed as an inclusive concept indicating a portion of an area or a function covered by a base station controller (BSC) in code division multiple access (CDMA), a Node-B in WCDMA, an eNB or a sector (a site) in LTE, and the like. Accordingly, a concept of the transmission/reception point, the base station (BS), and/or the cell may include a variety of coverage areas such as a megacell, a macrocell, a microcell, a picocell, a femtocell, and the like. Furthermore, such concept may include a communication range of the relay node (RN), the remote radio head (RRH), or the radio unit (RU).

In the present description, the user equipment and the transmission/reception point may be two transmission/reception subjects, having an inclusive meaning, which are used to embody the technology and the technical concept disclosed herein, and may not be limited to a specific term or word. Furthermore, the user equipment and the transmission/reception point may be uplink or downlink transmission/reception subjects, having an inclusive meaning, which are used to embody the technology and the technical concept disclosed in connection with the present embodiment, and may not be limited to a specific term or word. Herein, an uplink (UL) transmission/reception is a scheme in which data is transmitted from user equipment to a base station. Alternatively, a downlink (DL) transmission/reception is a scheme in which data is transmitted from the base station to the user equipment.

The wireless communication system may use a variety of multiple access schemes such as CDMA, time division multiple access (TDMA), frequency division multiple access (FDMA), orthogonal frequency division multiple access (OFDMA), OFDM-FDMA, OFDM-TDMA, OFDM-CDMA, and/or the like. Such multiple access schemes, however, are not limited thereto. At least one embodiment may be applied to resource allocation in the field of asynchronous wireless communications evolving to LTE and LTE-advanced (LTE-A) through GSM, WCDMA, and HSP, and in the field of synchronous wireless communications evolving into CDMA, CDMA-2000, and UMB. The present embodiment should not be construed as being limited to or restricted by a particular wireless communication field, and should be construed as including all technical fields to which the spirit of the present embodiment can be applied.

In the case of an uplink transmission and a downlink transmission, at least one of a time division duplex (TDD) and a frequency division duplex (FDD) may be used. Herein, the TDD may perform the uplink/downlink transmissions using different times. The FDD may perform the uplink/downlink transmissions using different frequencies.

In a LTE or LTE-A system in conformance with a corresponding standard, an uplink and/or a downlink may be constituted based on one carrier or a pair of carriers. In the case of the uplink and/or downlink, control information may be transmitted through such control channels as a physical downlink control channel (PDCCH), a physical control format indicator channel (PCFICH), a physical hybrid ARQ indicator channel (PHICH), a physical uplink control channel (PUCCH), and/or so forth. Data may be transmitted through such data channels as a physical downlink shared channel (PDSCH), a physical uplink shared channel (PUSCH), and/or the like.

In the description, the term "cell" may indicate one of coverage of a signal transmitted from a transmission point or transmission/reception point, a component carrier having the coverage, and the transmission/reception point. Herein, the term "transmission/reception point" may indicate one of a transmission point transmitting a signal, a reception point receiving a signal, and a combination thereof (i.e., a transmission/reception point).

FIG. 1 is an exemplary diagram illustrating a wireless communication system to which at least one embodiment may be applied.

Referring to FIG. 1, wireless communication system 100 may be one of a coordinated multi-point transmission/reception (CoMP) system, a coordinated multi-antenna transmission system, and a coordinated multi-cell communication system. Herein, the CoMP system may transmit signals through cooperation between a plurality of transmission/reception points. Wireless communication system 100 such as a CoMP system may include a plurality of transmission/reception points 110 and 112, and at least one user equipment (UE) 120 and 122.

The transmission/reception points may be, as shown in the figure, one of transmission/reception point (e.g., eNB) 110 and transmission/reception point (e.g., RRH) 112. Herein, eNB 110 may be a base station or a macrocell (or macronode). RRH 112 may be at least one picocell which is wiredly controlled by coupling to eNB 110 through an optical cable or an optical fiber. Furthermore, RRH 112 may have either a high transmission power, or a low transmission power within a macrocell region. The transmission/reception points eNB 110 and RRH 112 may have the same cell identity (ID) or different cell identities.

Hereinafter, a downlink (DL) may represent communication or a communication path from transmission/reception points 110 and 112 to user equipment 120. An uplink (UL) may represent communication or a communication path from user equipment 120 to transmission/reception points 110 and 112. In the downlink, a transmitter may be a portion of transmission/reception points 110 and 112, and a receiver may be a portion of user equipment 120 and 122. In the uplink, a transmitter may be a portion of user equipment 120, and a receiver may be a portion of transmission/reception points 110 and 112.

Hereinafter, a situation in which a signal is transmitted or received through such channels as PUCCH, PUSCH, PDCCH, and/or PDSCH may be referred to by the expression "transmit or receive PUCCH, PUSCH, PDCCH, and/or PDSCH."

eNB (e.g., 110) may perform a downlink transmission to user equipment (e.g., 120 and/or 122). eNB (e.g., 110) may transmit PDSCH corresponding to a primary physical channel, for unicast transmission. Furthermore, eNB (e.g., 110) may transmit PDCCH in order to transmit downlink control information, such as scheduling information required for receiving PDSCH, and to transmit scheduling grant information for an uplink data channel (e.g., PUSCH) transmission. Hereinafter, "transmit or receive a signal through a channel" may be referred to as the expression of "transmit or receive a channel."

In a wireless communication, one radio frame may consist of 10 subframes, and one subframe may consist of two slots. The radio frame may have a length of 10 ms, and the subframe may have a length of 1.0 ms. Typically, a basic unit of a data transmission may be a subframe, and a downlink or uplink scheduling may be performed in a unit of subframes. In the case of a normal cyclic prefix (CP), one slot may include 7 OFDM symbols in the time domain. In the case of an extended cyclic prefix (CP), one slot may include 6 OFDM symbols in the time domain.

For example, the frequency domain in a wireless communication may be formed in a unit of subcarriers having an interval of 15 kHz.

In a downlink, time-frequency resources may be determined in a unit of resource blocks (RBs). A resource block (RB) may consist of one slot in the time axis and 180 kHz (12 subcarriers) in the frequency axis. Resource elements consisting of 'one subcarrier (corresponding to 2 slots) in the time axis' and '12 subcarriers in the frequency axis' may be referred to as 'a resource-block pair (RBP).' A total number of resource blocks may differ according to a system bandwidth.

A resource element (RE) may consist of one OFDM symbol in the time axis and one subcarrier in the frequency axis. One resource-block pair (RBP) may include '14×12 resource elements' (in the case of a normal CP) or '12×12 resource elements' (in the case of an extended CP).

Figure 2:
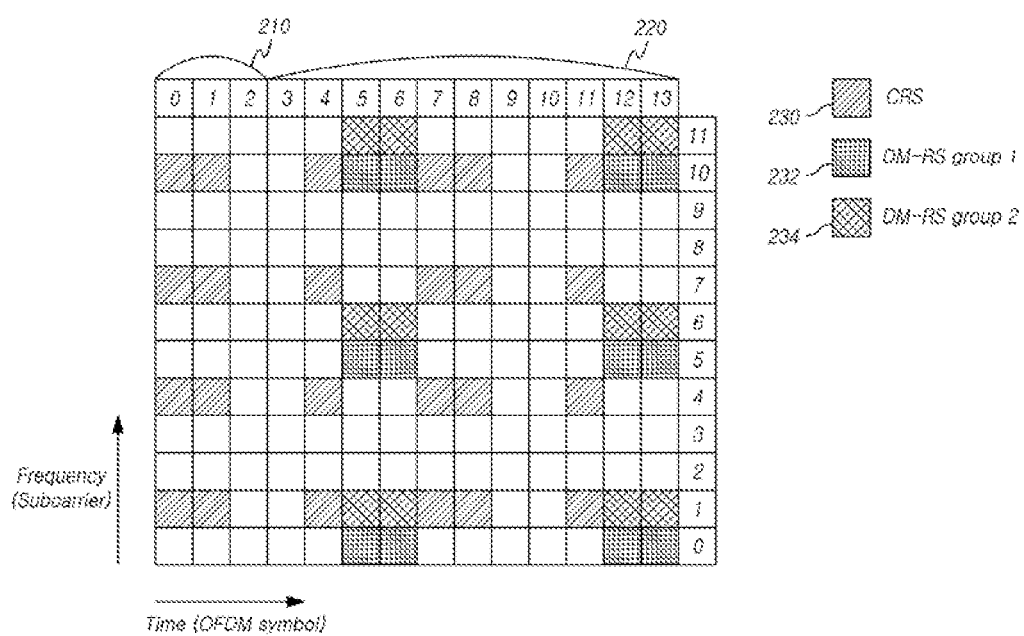
FIG. 2 illustrates one resource-block pair in the case of a normal cyclic prefix (normal CP), as an example of a structure of downlink resources in a long term evolution (LTE) or LTE-Advanced (LTE-A) system.

FIG. 2 illustrates one resource-block pair (RBP) in the case of a normal cyclic prefix (normal CP), as an example of a structure of downlink resources in a long term evolution (LTE) or LTE-Advanced (LTE-A) system.

Referring to FIG. 2, in the case of a normal cyclic prefix (CP), one resource-block pair (RBP) may consist of 14 OFDM symbols (l=0, 1, . . . , 13) and 12 subcarriers (k=0, . . . , 11). In an embodiment shown in FIG. 2, one resource-block pair (RBP) may include 14 OFDM symbols. Among the 14 OFDM symbols, preceding three OFDM symbols (l=0~2) may correspond to control region 210 assigned for control channels such as a physical control format indicator channel (PCFICH), a physical hybrid ARQ indicator channel (PHICH), a physical downlink control channel (PDCCH), and so forth. The remaining OFDM symbols (l=3~13) may correspond to data region 220 assigned for data channels such as a physical downlink shared channel (PDSCH). Although three OFDM symbols are allocated for control region 210 in FIG. 2, one to four OFDM symbols may be allocated for control region 210, according to embodiments. Information on the size of control region 210 may be transferred through the PCFICH. Herein, the size information may be set as the number of OFDM symbols.

PDCCH may be transmitted through an entire system bandwidth, PDSCH may be transmitted based on resource blocks. User equipment may identify a corresponding PDCCH (i.e., a PDCCH assigned to the user equipment), and enter a micro sleep mode when there is no data (i.e., data for the user equipment) in the corresponding PDCCH. Accordingly, it may be possible to reduce a power consumption of the user equipment in data region 220.

Referring to FIG. 2, reference signals may be mapped to specific resource elements of a downlink. That is, a common reference signal (or cell-specific reference signal, hereinafter referred to as "CRS") 230, demodulation reference signals (DM-RS) (or UE-specific reference signals) 232 and 234, a channel-state information reference signal (CSI-RS), and so forth may be transmitted through a downlink. In FIG. 2, only CRS 230 and DM-RS 232 and 234 have been illustrated for convenience of description.

CRS 230 in control region 210 may be used to perform channel estimation for decoding of PDCCH. CRS 230 in data region 220 may be used for downlink channel measurement.

Channel estimation for data decoding of data region 220 may be performed using DM-RSs 232 and/or 234. DM-RSs 232 and 234 may be multiplexed using orthogonal codes, as reference signals for a plurality of layers. For example, in the case of 4-layer transmission, two different reference signals for each reference signal group may be multiplexed by applying 'an orthogonal code having a length of 2' to 'two consecutive reference signal resource elements in the time axis.' In the case of 8-layer transmission, four different reference signals for each reference signal group may be multiplexed by applying 'an orthogonal code having a length of 4' to 'four reference signal resource elements distributed in the time axis.'

In the case of 1-layer transmission or 2-layer transmission, since a reference signal of each layer may be transmitted using only one DM-RS group (e.g., DM-RS group 1 (232)), another DM-RS group (e.g., DM-RS group 2 (234)) may be used for a data transmission. DM-RS corresponding to each layer may be pre-coded according to a pre-coding scheme applied to each layer, and be transmitted to user equipment. Accordingly, a receiving side (e.g., user equipment) may perform a data decoding without pre-coding information applied in a transmitting side (e.g., a base station).

In order to efficiently use limited resources in a wireless communication system, a control channel might be required. However, resources of control region 210 may correspond to system overhead, and therefore reduce resources of data region 220 available for data transmission. In an LTE system based on OFDM, one resource-block pair (RBP) may consist of 14 or 12 OFDM symbols. Among the OFDM symbols, a maximum of 3 OFDM symbols may be used for control region 210, and the remaining OFDM symbols may be used for data region 220. Meanwhile, in an LTE-A system capable of transmitting data to more users, system capacity enhancement may be restricted due to restricted resources of a typical control region (e.g., 210). Accordingly, in order to increase control channel resources, considering a method of transmitting/receiving multi-user control channels might be required, such as using a spatial division multiplexing scheme in data region 220. In other words, such method may transmit/receive control channels in data region 220. For example, a control channel transmitted in data region 220 may be referred to as 'extended PDCCH' or 'enhanced PDCCH' (EPDCCH), and is not limited thereto.

In a typical (or existing) 3GPP LTE/LTE-A rel-8/9/10 system, in order to receive a downlink DCI, all user equipment depend on the PDCCH which is transmitted through 'the first one, two, or three OFDM symbols' (in the case that system bandwidth>10 PRBs) or 'the first two, three, or four OFDM symbols' (in the case that system bandwidth≤10 PRBs) in a downlink subframe. A basic unit of a PDCCH transmission for a given user equipment may be a control channel element (CCE). Herein, one CCE may consist of 9 resource element groups (REGs). One REG may consist of four consecutive resource elements (REs) in the frequency axis. Particularly, the four consecutive resource elements (REs) of the one REG may be selected, among the remaining resource elements (REs) excluding resource elements (REs) transmitting different physical channels (e.g., PCFICH, PHICH) and physical signals (e.g., CRS) in a PDCCH region of a corresponding downlink subframe.

In order to perform an EPDCCH resource mapping for a given user equipment, an enhanced REG (EREG) or enhanced CCE (ECCE) corresponding to an REG or CCE of a typical PDCCH may be adopted or defined in the EPDCCH.

Unlike the above-described legacy PDCCH, EPDCCH newly adopted (or defined) in a system associated with 3GPP LTE/LTE-A release 11 and its follow-up releases may be assigned in a PDSCH region of a downlink pilot time slot (DwPTS) in a downlink subframe or a special subframe. Furthermore, 3GPP LTE/LTE-A release 11 and its follow-up releases define that a corresponding cell may assign a K number of EPDCCH sets for the user equipment configured to receive downlink control information (DCI) through the EPDCCH. Herein, each EPDCCH set may consist of a group of 'M' PRBs. The 'M' is a natural number which is greater than or equal to "1" and is less than or equal to the number of PRBs associated with a downlink bandwidth. A maximum value of the 'K' may be selected as one of 2, 3, 4, and 6. Furthermore, each of the plurality of EPDCCH set determined for a given user equipment may have a different 'M' value.

Furthermore, each EPDCCH set may be determined as one of a distributed type and a localized type, and be signaled according to the determined type.

EPDCCH sets may correspond to a localized type or a distributed type according to EPDCCH transmission types. The above-described 'M' may be 1 or $2^n$ (n=1, 2, 3, 4, or 5) for a localized type, and is not limited thereto. Meanwhile, the 'M' may be 2, 4, 8, or 16 for a distributed type, and is not limited thereto.

Figure 3:
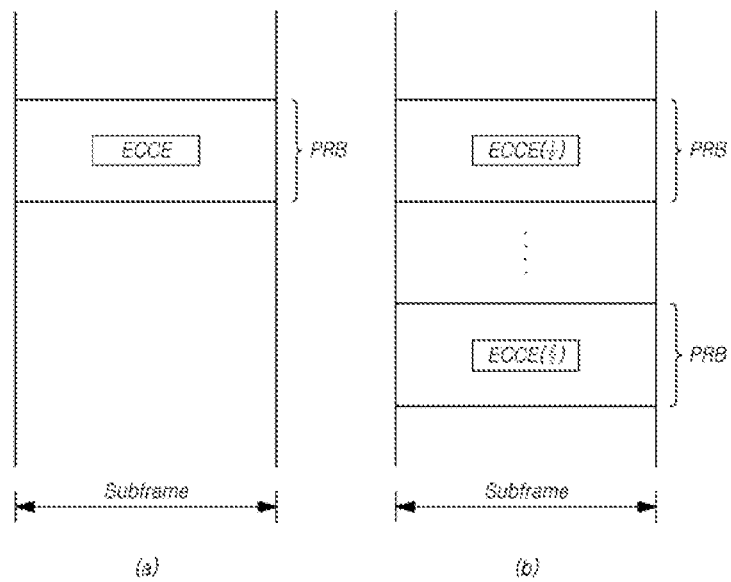
FIG. 3 illustrates two types of EPDCCH transmissions including a localized EPDCCH transmission and a distributed EPDCCH transmission.

FIG. 3 illustrates two types of EPDCCH transmissions including a localized EPDCCH transmission and a distributed EPDCCH transmission.

The number of downlink physical resource blocks (PRBs) may be referred to as $N_{PRB}$. Herein, the downlink PRBs may constitute a system bandwidth supported in a certain cell configured by communication providers. EPDCCH may be transmitted through a corresponding PDSCH region. In this case, a transmission type of the EPDCCH may correspond to one of a localized EPDCCH transmission and a distributed EPDCCH transmission, as shown in FIGS. 3a and 3b. Accordingly, an ECCE structure and the number of resource elements (REs) constituting one ECCE may differ according to each EPDCCH transmission type. Alternatively, the ECCE structure and the number of resource elements (REs) per ECCE may be the same regardless of EPDCCH transmission types.

The localized EPDCCH transmission as shown in FIG. 3a may illustrate that one ECCE is located and transmitted in one resource-block pair (e.g., one PRB pair). The distributed EPDCCH transmission as shown in FIG. 3b may illustrate that one ECCE is located and transmitted in at least two resource-block pairs (e.g., two PRB pairs).

Meanwhile, the K number of EPDCCH sets may be assigned for one user equipment. In this case, since each EPDCCH set is of either a distributed type or a localized type, a $K_L$, number of localized EPDCCH sets and a $K_D$ number of distributed EPDCCH sets may be assigned for one user equipment. That is, a sum of $K_L$, and $K_D$ may be "K" ($K_L + K_D = K$).

In the case of a newly-defined EREG/ECCE, a total of 16 EREGs (e.g., EREG #0 to EREG #15) may be included in one PRB pair of each EPDCCH set. Particularly, the one PRB pair may include a total of 16 EREGs, regardless of (i) a frame structure type, (ii) a subframe configuration, (iii) a length of a cyclic prefix (CP), (iv) a size of a legacy PDCCH control region, and/or (v) whether there are other reference signals (e.g., CRS, CSI-RS, PRS, etc.) excluding DM-RS.

More specifically, in the case of a normal cyclic prefix (CP), one PRB pair in a certain EPDCCH set may include a total of 168 resource elements (REs) (e.g., 12×14=168 REs). In this case, an EREG indexing may be performed for the remaining resource elements (REs) (e.g., 144 REs) excluding '24 resource elements (REs) for DM-RS' from the 168 resource elements (REs). In other words, the EREG indexing may be performed using 16 numbers (e.g., 0, 1, 2, . . . , 15) according to a frequency-first scheme (i.e., a frequency first and then time manner). Accordingly, corresponding resource elements (REs) may be numbered (i.e., indexed) from 0 to 15. Similarly, in the case of an extended cyclic prefix (CP), one PRB pair in a certain EPDCCH set may include a total of 144 resource elements (REs) (e.g., 12×12=144 REs). In this case, an EREG indexing may be performed for the remaining resource elements (REs) (e.g., 128 REs) excluding '16 resource elements (REs) for DM-RS' from the 144 resource elements (REs). In other words, the EREG indexing may be performed using 16 numbers (e.g., 0, 1, 2, . . . , 15) according to a frequency-first scheme (i.e., a frequency first and then time manner). Accordingly, corresponding resource elements (REs) may be numbered (i.e., indexed) from 0 to 15.

In a downlink subframe corresponding to a normal cyclic prefix (CP) ("a normal DL subframe"), embodiments associated with an EREG indexing procedure for one PRB pair in a certain EPDCCH set will be described with reference to FIG. 4 to FIG. 9. In FIG. 4 to FIG. 9, deviant crease line portions without numerals may represent resource elements (REs) used for DS-RS, and deviant crease line portions or lattice-pattern portions with numerals may represent resource elements (REs) used for a CRS transmission.

Figure 4:
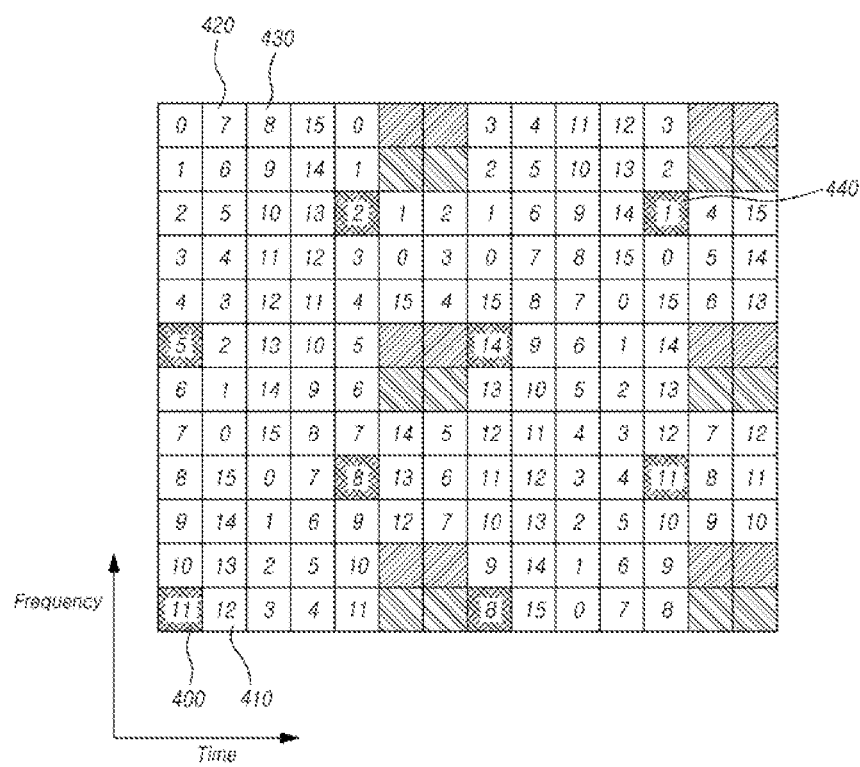
FIG. 4 illustrates a resource element (RE) mapping of a physical resource block (PRB) pair indexed according to an FIG. 5 illustrates an RE mapping of a PRB pair indexed according to an EREG indexing procedure with a symbol-based cyclic shift, in the case of two transmission antenna ports (CRS ports 0 and 1)

FIG. 4 illustrates a resource element (RE) mapping of a physical resource block (PRB) pair indexed according to an EREG indexing procedure with a symbol-based cyclic shift, in the case of one transmission antenna port (e.g., CRS port 0).

Referring to FIG. 4, EREGs may be numbered (i.e., indexed) from 0 to 15 according to a frequency-first scheme (i.e., a frequency first and then time manner). In embodiments shown in FIG. 4, indexing may be performed using a symbol-based cyclic shift. More specifically, as shown in FIG. 4, after a resource element (RE) indicated by "400" in the first symbol is indexed as 11 (i.e., index 11), a neighboring RE indicated by "410" in the second symbol is continuously indexed as 12 (i.e., index 12). In a same manner, after a resource element (RE) indicated by "420" in the second symbol is indexed as 7 (i.e., index 7), a neighboring RE indicated by "430" in a third symbol is continuously indexed as 8 (i.e., index 8).

A physical resource block (PRB) pair shown in FIG. 4 may be associated with CRS port 0. As shown in FIG. 4, CRSs may be mapped to 8 resource elements (REs). In other embodiments, the CRSs may be mapped to REs being at other positions according to frequency shifts.

Figure 5:
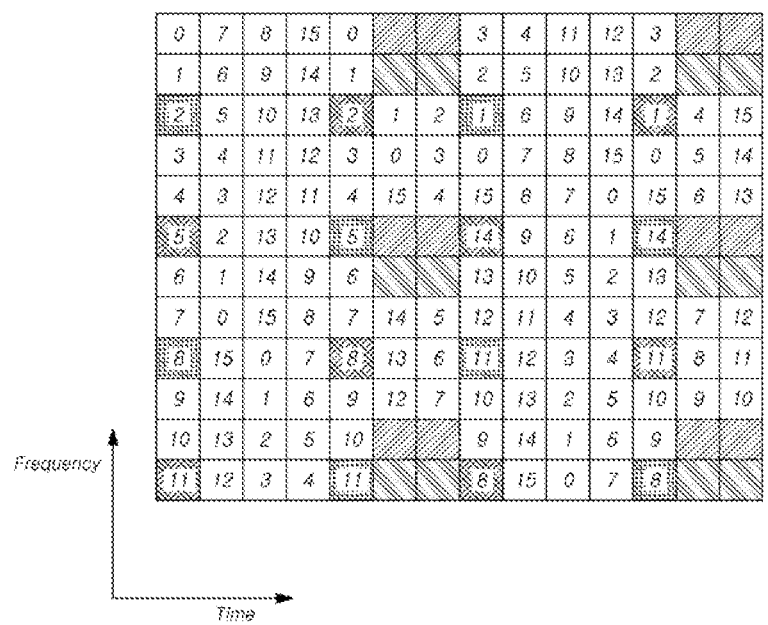
Figure 6:
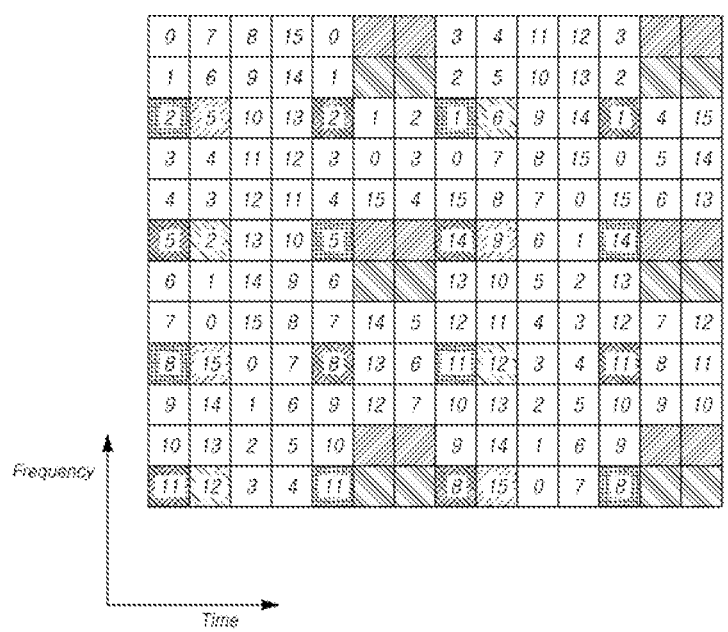
FIG. 6 illustrates an RE mapping of a PRB pair indexed according to an EREG indexing procedure with a symbol-based cyclic shift, in the case of four transmission antenna ports (CRS ports 0, 1, 2, and 3)

FIG. 5 illustrates a resource element (RE) mapping of a physical resource block (PRB) pair indexed according to an EREG indexing procedure with a symbol-based cyclic shift, in the case of two transmission antenna ports (e.g., CRS ports 0 and 1). FIG. 6 illustrates an RE mapping of a PRB pair indexed according to an EREG indexing procedure with a symbol-based cyclic shift, in the case of four transmission antenna ports (e.g., CRS ports 0, 1, 2, and 3).

Resource elements (REs) shown in FIG. 5 and FIG. 6 may be indexed using a symbol-based cyclic shift, in the same manner as in FIG. 4. In FIG. 5, CRSs may be mapped to '8 additional REs' as well as 'the REs for CRS shown in FIG. 4' for CRS ports 0 and 1. In FIG. 6, CRSs may be mapped to '8 additional REs' as well as 'the REs for CRS shown in FIG. 5' for CRS ports 0, 1, 2, and 3.

Figure 7:
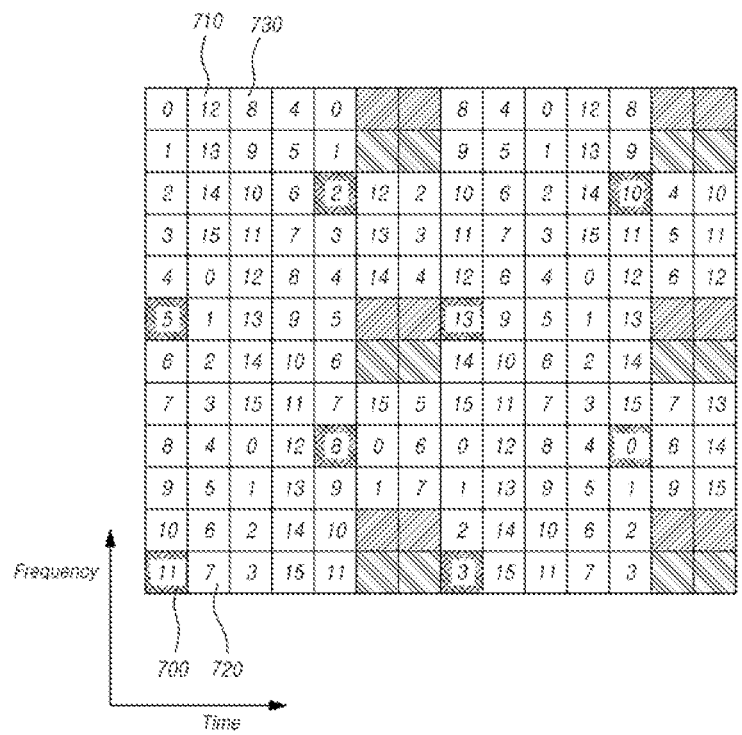
FIG. 7 illustrates an RE mapping of a PRB pair indexed according to an EREG indexing procedure without a cyclic shift, in the case of one transmission antenna port (CRS port 0)
Figure 8:
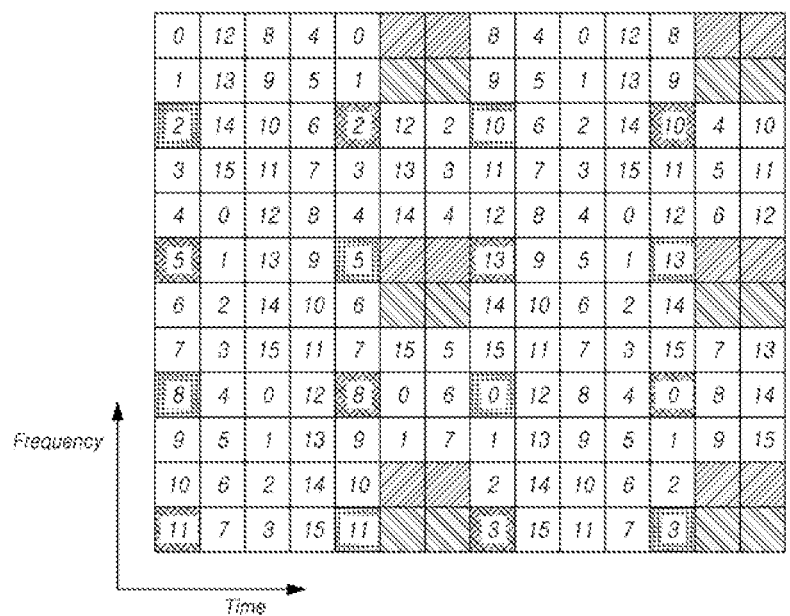
FIG. 8 illustrates an RE mapping of a PRB pair indexed according to an EREG indexing procedure without a cyclic shift, in the case of two transmission antenna ports (CRS ports 0 and 1)
Figure 9:
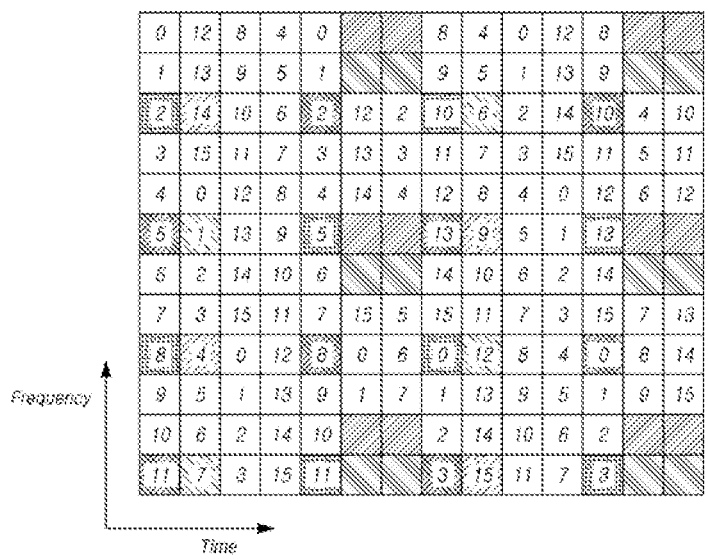
FIG. 9 illustrates an RE mapping of a physical resource block (PRB) pair indexed according to an EREG indexing procedure without a cyclic shift, in the case of four transmission antenna ports (CRS ports 0, 1, 2, and 3)

In the case that an EREG indexing is performed per OFDM symbol, FIG. 4 to FIG. 6 illustrate embodiments to which a cyclic shift is applied, and FIG. 7 to FIG. 9 illustrate embodiments to which a cyclic shift is not applied.

FIG. 7 illustrates an RE mapping of a PRB pair indexed according to an EREG indexing procedure without a cyclic shift, in the case of one transmission antenna port (e.g., CRS port 0). FIG. 8 illustrates an RE mapping of a PRB pair indexed according to an EREG indexing procedure without a cyclic shift, in the case of two transmission antenna ports (e.g., CRS ports 0 and 1). FIG. 9 illustrates an RE mapping of a physical resource block (PRB) pair indexed according to an EREG indexing procedure without a cyclic shift, in the case of four transmission antenna ports (e.g., CRS ports 0, 1, 2, and 3).

In FIG. 7 to FIG. 9, a mapping of CRSs may be performed in the same manner as in FIG. 4 to FIG. 6. However, the indexing schemes employed may differ.

Representatively, referring to FIG. 7, EREGs may be numbered (i.e., indexed) from 0 to 15 according to a frequency-first scheme (i.e., a frequency first and then time manner). In embodiments shown in FIG. 7, indexing may be performed without a symbol-based cyclic shift. More specifically, as shown in FIG. 7, after a resource element (RE) indicated by "700" in the first symbol is indexed as 11 (i.e., index 11), an RE indicated by "710" in the second symbol is continuously indexed as 12 (i.e., index 12). Herein, the RE ("710") indexed as 12 (i.e., the RE ("710") corresponding to a next turn) is not adjacent to the RE ("700") indexed as 11. In the same manner, after an RE indicated by "720" in the second symbol is indexed as 7 (i.e., index 7), an RE indicated by "730" in a third symbol is continuously indexed as 8 (i.e., index 8). Herein, the RE ("730") indexed as 8 (i.e., the RE ("730") corresponding to a next turn) is not adjacent to the RE ("720") indexed as 7.

In FIG. 4 to FIG. 9, REs having the same index may be grouped into one EREG. Accordingly, in the case of one PRB pair, a total of 16 EREGs (e.g., EREG #0 to EREG #15) may be assigned. FIG. 4 to FIG. 9 illustrate embodiments associated with a PRB pair with a normal CP. That is, one PRB pair with the normal CP may include a total of 16 EREGs. Similarly, even in the case of one PRB pair with an extended CP, a total of 16 EREGs (e.g., EREG #0 to EREG #15) may be assigned. That is, one PRB pair with the extended CP may include a total of 16 EREGs.

According to FIG. 4 to FIG. 9, each of the EREG (e.g., EREG #0, EREG #1, . . . , EREG #15) configured in one PRB pair may consist of 9 REs. However, as shown in FIG. 4 to FIG. 9, the number of REs available for an EPDCCH transmission per EREG may differ according to the number of transmission antenna ports (or, a CRS port number) and a size of a legacy PDCCH control region.

Referring back to FIG. 4, a total number of REs corresponding to index #0 is 9. However, in the case that a region associated with 'the first three OFDM symbols' (l=0~2) are determined as a control region, REs included in the control region may not transmit EPDCCH, and therefore be excluded in the REs available for an EPDCCH transmission. Accordingly, EREG #0 may consist of a total of 6 available REs. In the case of an EREG corresponding to index #1, a total of REs indexed as #1 is 9. In this case, (i) REs within the control region (e.g., a region associated with the first three OFDM symbols) and (ii) REs (e.g., RE indicated by "440" in FIG. 4) to which CRSs are mapped may be excluded. Accordingly, EREG #1 may consist of a total of 5 available REs.

Each ECCE corresponding to a basic unit of an EPDCCH transmission may consist of an 'N' number of EREGs according to a subframe type and a CP length. More specifically, the N value may be determined as below.

In at least one embodiment, in the case of (i) normal subframes with a normal CP and (ii) special subframes with special subframe configuration 3, 4, or 8 and a normal CP, the N value may be determined as '4' (N=4). In other words, in this case, if 16 EREGs are included in one PRB pair, a total of 4 ECCEs may be configured since each ECCE consists of 4 EREGs.

In other embodiments, in the case of (i) normal subframes with an extended CP, (ii) special subframes with special subframe configuration 1, 2, 6, 7, or 9 and a normal CP, and (iii) special subframes with special subframe configuration 1, 2, 3, 5, or 6 and an extended CP, the N value may be determined as '8' (N=8). In other words, in this case, if 16 EREGs are included in one PRB pair, a total of 2 ECCEs may be configured since each ECCE consists of 8 EREGs.

In the case of a certain downlink subframe (e.g., a normal DL subframe), a typical PDCCH may be transmitted through 'the first one, two, or three OFDM symbols' or 'the first two, three, or four OFDM symbols.' Furthermore, one CCE may consist of 9 REGs. Accordingly, the CCEs in PDCCH may consist of 36 (=9×4) REs.

However, as described with reference to FIG. 4 to FIG. 9, in the case of EPDCCH, EREG indexing may be performed per RE, without considering a size of a legacy control region (i.e., a size of a legacy PDCCH control region) and REs used for other reference signals such as CRS and CSI-RS. Accordingly, the number of REs available for an EPDCCH transmission may differ according to a size of the legacy control region and the presence of the other reference signals (e.g., CRS, CSI-RS, etc.) in a certain downlink subframe. In other words, the number of REs available for an EPDCCH transmission may differ per EREG. Accordingly, in the case of an ECCE corresponding to a basic unit of an EPDCCH transmission, there may be an RE imbalance that the number of available REs differs per ECCE.

To overcome such problem, the present embodiment may provide a mapping method of EREGs constituting each ECCE. Particularly, the present embodiment may provide a method of performing an ECCE/EREG mapping (or may be referred to "an ECCE-to-EREG mapping") in a distributed EPDCCH set (i.e., an EPDCCH set of a distributed type).

In the case of a distributed EPDCCH transmission, to maximize a frequency diversity gain, EREGs constituting one ECCE may be configured to be distributed to an M number of PRB pairs included in a corresponding EPDCCH set. In view of such situation, the present embodiment may provide a method of performing an ECCE/EREG mapping in a distributed EPDCCH set.

More specifically, the present embodiment may provide a method of configuring each ECCE in an M number of PRB pairs forming a distributed EPDCCH set as described above. Especially, the present embodiment may consider a legacy PDCCH and CRSs transmitted through downlink pilot time slots (DwPTSs) in all downlink subframes and special subframes. Accordingly, the present embodiment may provide a relatively optimal ECCE/EREG mapping method considering the number of available REs for an EPDCCH transmission in a corresponding PRB pair.

Referring to FIG. 4 to FIG. 9, each of the EREGs (e.g., EREG #0, EREG #1, . . . , EREG #15) configured in one PRB pair may include 9 REs. However, as shown in FIG. 4 to FIG. 9, the number of available REs per EREG may be determined based on the number of CRS ports and a size of a legacy PDCCH control region. Herein, the available REs may represent REs available for an EPDCCH transmission. In the case that an EPDCCH set is configured according to a legacy PDCCH control region size and a CRS port configuration corresponding to a normal downlink subframe as shown in FIG. 4, Table 1 to Table 3 below may represent the number of available REs per EREG index in one PRB pair included in the EPDCCH set.

TABLE 1

|          | CRS port 0 | CRS port 0, 1 | CRS port 0, 1, 2, 3 |
|----------|------------|---------------|---------------------|
| EREG # 0 | 7 | 6 | 6 |
| EREG # 1 | 8 | 8 | 7 |
| EREG # 2 | 7 | 7 | 7 |
| EREG # 3 | 7 | 6 | 6 |
| EREG # 4 | 8 | 8 | 8 |
| EREG # 5 | 8 | 7 | 7 |
| EREG # 6 | 8 | 8 | 7 |
| EREG # 7 | 8 | 8 | 7 |
| EREG # 8 | 7 | 7 | 7 |
| EREG # 9 | 8 | 8 | 8 |
| EREG # 10 | 7 | 6 | 6 |
| EREG # 11 | 8 | 7 | 7 |
| EREG # 12 | 9 | 9 | 8 |
| EREG # 13 | 8 | 7 | 7 |
| EREG # 14 | 9 | 9 | 9 |
| EREG # 15 | 9 | 9 | 9 |

Table 1 above may represent the number of available resource elements (REs) per EREG according to each CRS port configuration, in the case that a size of a legacy PDCCH control region is '1' OFDM symbol. Herein, Table 1 above is created based on an EREG indexing to which a cyclic shift is not applied.

TABLE 2

|          | CRS port 0 | CRS port 0, 1 | CRS port 0, 1, 2, 3 |
|----------|------------|---------------|---------------------|
| EREG # 0 | 6 | 5 | 5 |
| EREG # 1 | 7 | 7 | 6 |
| EREG # 2 | 6 | 6 | 6 |
| EREG # 3 | 6 | 5 | 5 |
| EREG # 4 | 7 | 7 | 7 |
| EREG # 5 | 7 | 6 | 6 |
| EREG # 6 | 7 | 7 | 6 |
| EREG # 7 | 7 | 7 | 6 |
| EREG # 8 | 7 | 7 | 7 |
| EREG # 9 | 8 | 8 | 8 |
| EREG # 10 | 7 | 6 | 6 |
| EREG # 11 | 8 | 7 | 7 |
| EREG # 12 | 8 | 8 | 7 |
| EREG # 13 | 7 | 6 | 6 |
| EREG # 14 | 8 | 8 | 8 |
| EREG # 15 | 8 | 8 | 8 |

Table 2 above may represent the number of available REs per EREG according to each CRS port configuration, in the case that a size of a legacy PDCCH control region is '2' OFDM symbols. Herein, Table 2 above is created based on an EREG indexing to which a cyclic shift is not applied.

TABLE 3

|          | CRS port 0 | CRS port 0, 1 | CRS port 0, 1, 2, 3 |
|----------|------------|---------------|---------------------|
| EREG # 0 | 5 | 4 | 4 |
| EREG # 1 | 6 | 6 | 5 |
| EREG # 2 | 5 | 5 | 5 |
| EREG # 3 | 5 | 4 | 4 |
| EREG # 4 | 7 | 7 | 7 |
| EREG # 5 | 7 | 6 | 6 |
| EREG # 6 | 7 | 7 | 6 |
| EREG # 7 | 7 | 7 | 6 |
| EREG # 8 | 6 | 6 | 6 |
| EREG # 9 | 7 | 7 | 7 |
| EREG # 10 | 6 | 5 | 5 |
| EREG # 11 | 7 | 6 | 6 |
| EREG # 12 | 7 | 7 | 6 |

TABLE 3-continued

|  | CRS port 0 | CRS port 0, 1 | CRS port 0, 1, 2, 3 |
|---|---|---|---|
| EREG # 13 | 6 | 5 | 5 |
| EREG # 14 | 7 | 7 | 7 |
| EREG # 15 | 7 | 7 | 7 |

Table 3 above may represent the number of available REs per EREG according to each CRS port configuration, in the case that a size of a legacy PDCCH control region is '3' OFDM symbols. Herein, Table 3 above is created based on an EREG indexing to which a cyclic shift is not applied.

Referring to Table 1 to Table 3, it is known that the number of REs available for an EPDCCH transmission per EREG may differ. For this reason, the number of available REs per EREG may differ according to a scheme of assigning EREGs to ECCEs.

In view of such situation, the present embodiment may provide an ECCE/EREG mapping method in a distributed EPDCCH set.

In the case that a certain EPDCCH set consists of an M number of PRB pairs, a PRB pair associated with the present embodiment may be referred to as "an enhanced physical resource block (EPRB)," for a distinction from a PRB corresponding to a unit of a typical (or existing) PDSCH transmission. An EPRB index may be expressed as EPRB #m. More specifically, an M number of EPRBs may be numbered (i.e., indexed) from EPRB #0 to EPRB #(M−1), in an increasing order of indices (i.e., PRB indices) of PRB pairs constituting an EPDCCH set. In other words, an EPRB indexing may be sequentially performed including from the lowest PRB pair to the largest PRB pair. Herein, the lowest PRB pair may be a PRB pair having the lowest PRB index, and the largest PRB pair may be a PRB pair having the largest PRB index.

Embodiment 1

In the case of a distributed EPDCCH transmission, Embodiment 1 may provide a method of maximizing a frequency diversity gain corresponding to an important performance index. More specifically, in Embodiment 1, in the case that a distributed EPDCCH set includes an M number of EPRBs, each of the ECCEs constituting the distributed EPDCCH set may be configured through an N number of distributed EPRBs, according to two conditions below.

In the case of 'Condition 1-1' (i.e., N≥M), each ECCE may be mapped to an $$\frac{N}{M}$$

number of EREGs per EPRB, and be mapped to an N number of EREGs through a total M number of EPRBs (i.e., EPRB #m, for m=0, 1, 2, . . . , M−1). Herein, the each ECCE may consist of an N number of EREGs.

In the case of 'Condition 1-2' (i.e., N<M), each ECCE may be mapped to one EREG per EPRB. Accordingly, each ECCE may be mapped to an N number of corresponding EREGs through a total N number of distributed EPRBs. Herein, the each ECCE may consist of an N number of EREGs. The N number of corresponding EPRBs may correspond to an N number of EPRBs having an interval of $$\frac{M}{N}$$

EPRBs, among an M number of EPRBs forming a corresponding EPDCCH set.

For example, two PRB pairs (M=2) may be assigned to configure a distributed EPDCCH set for 'EPDCCH user equipment,' in a normal downlink subframe with a normal cyclic prefix (CP). Herein, the EPDCCH user equipment represents user equipment to which EPDCCH is applied. In this case (i.e., in the case of M=2), an indexing procedure for the two PRB pairs forming a corresponding EPDCCH set may be sequentially performed from the lowest PRB pair (i.e., a PRB pair having the lowest PRB index), in an increasing order of a corresponding PRB index. Accordingly, the two PRB pairs may be indexed as EPRB #0 and EPRB #1, respectively. In this case, the number of EREGs forming one ECCE in a normal downlink subframe with a normal CP may be 4 (N=4). Therefore, each ECCE may be configured with 4 EREGs including (i) 2 (=4/2) EREGs assigned in EPRB #0 and (ii) 2 EREGs assigned in EPRB #1, according to Condition 1-1 described above.

Figure 10:
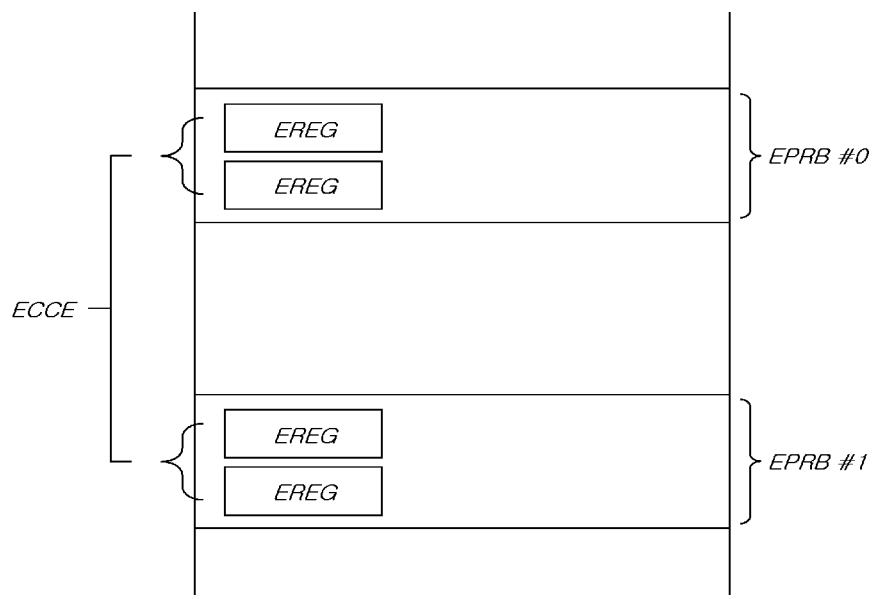
FIG. 10 illustrates an ECCE configuration in a distributed EPDCCH set configured with 2 EPRBs according to Embodiment 1.

FIG. 10 illustrates an ECCE configuration in a distributed EPDCCH set configured with 2 EPRBs according to Embodiment 1.

Referring to FIG. 10, a distributed EPDCCH set may consist of 2 PRB pairs such as EPRB #0 and EPRB #1. Each ECCE may be configured with 4 EREGs including (i) 2 EREGs assigned in EPRB #0 and (ii) 2 EREGs assigned in EPRB #1, according to Condition 1-1 above.

In other embodiments, 8 PRB pairs (M=8) may be assigned to configure a distributed EPDCCH set for an EPDCCH user equipment, in a normal downlink subframe with a normal CP. Herein, the EPDCCH user equipment represents user equipment to which EPDCCH is applied. In this case (i.e., in the case of M=8), an indexing procedure for the 8 PRB pairs forming a corresponding EPDCCH set may be sequentially performed from the lowest PRB pair (i.e., a PRB pair having the lowest PRB index), in an increasing order of a corresponding PRB index. Accordingly, the 8 PRB pairs may be indexed as EPRB #0, EPRB #1, . . . , EPRB #7, respectively. Even in this case, the number of EREGs constituting one ECCE in a normal downlink subframe with a normal CP may be 4 (N=4). Therefore, each ECCE may be configured by selecting one EREG per distributed EPRB. Herein, the distributed EPRBs may correspond to an N (N=4) number of EPRBs having an interval of $$\frac{M}{N} = \frac{8}{4} = 2$$

EPRBs. In other words, 4 EREGs may be mapped for a transmission of a corresponding ECCE. More specifically, one ECCE may be configured with 4 EREGs including (i) one EREG selected from EPRB #0, (ii) one EREG selected from EPRB #2, (iii) one EREG selected from EPRB #4, and (iv) one EREG selected from EPRB #6. Alternatively, one ECCE may be configured with 4 EREGs including (i) one EREG selected from EPRB #1, (ii) one EREG selected from EPRB #3, (iii) one EREG selected from EPRB #5, and (iv) one EREG selected from EPRB #7.

Figure 11:
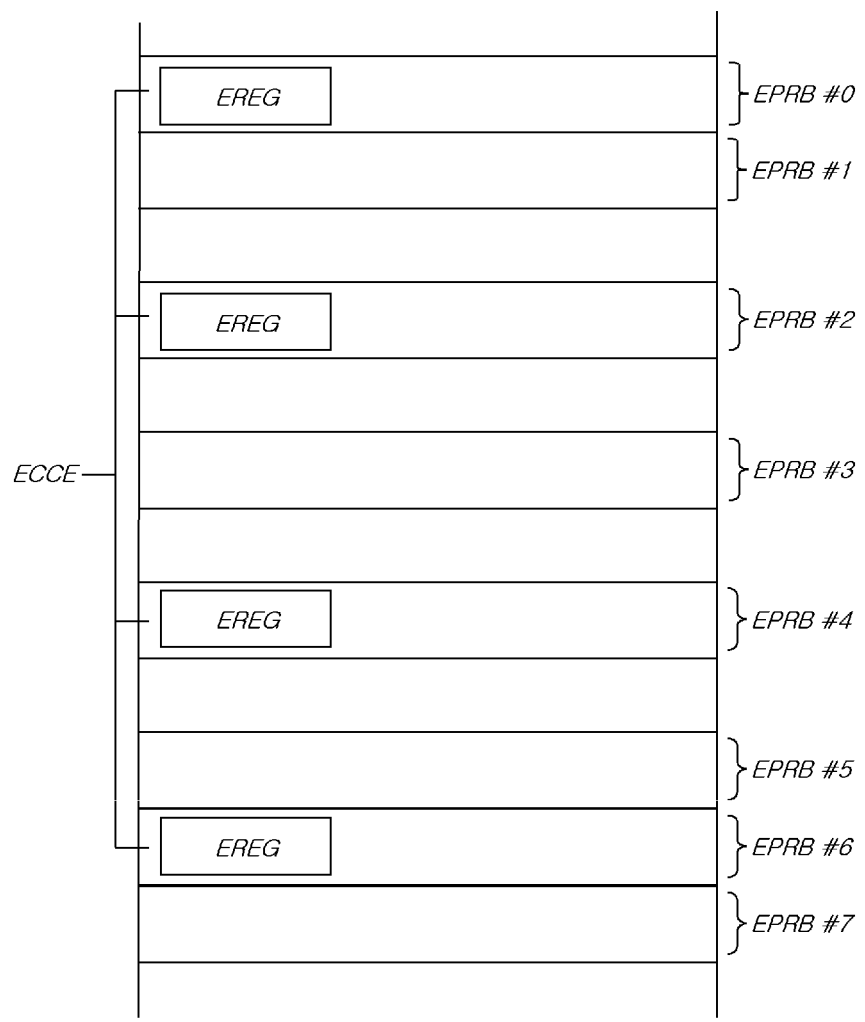
FIG. 11 illustrates an ECCE configuration in a distributed EPDCCH set configured with 8 EPRBs according to Embodiment 1.

FIG. 11 illustrates an ECCE configuration in a distributed EPDCCH set configured with 8 EPRBs according to Embodiment 1.

Referring to FIG. 11, a distributed EPDCCH set may consist of 8 PRB pairs including EPRB #0 to EPRB #7. As shown in FIG. 11, one ECCE may be configured by assigning one EREG to each of EPRB #0, EPRB #2, EPRB #4, and EPRB #4 according to Condition 1-2 above.

Embodiment 2

In order to configure one ECCE in a distributed EPDCCH set, an EREG selection method is defined (i.e., a method of selecting an EREG (or EREGs) in a corresponding EPRB), along with an EPRB mapping method described in Embodiment 1 above. Herein, an ECCE/EREG mapping method will be provided according to three embodiments below using a combination of 'an EREG selection method' and 'an EPRB hopping method of Embodiment 1.'

Embodiment 2-1

As a first embodiment, a corresponding ECCE may be configured with 'EREGs having an identical index' which are selected from each EPRB mapped to configure one ECCE according to Embodiment 1. More specifically, in order to configure one ECCE, in the case of Condition 1-1, an $$\frac{N}{M}$$

number of EREGs per EPRB may be mapped. Meanwhile, in the case of Condition 1-2, one EREG per EPRB may be mapped. In these cases, each ECCE may be configured by mapping 'EREGs having an identical index' in each EPRB. A total of $$\frac{16}{N} \times M$$

number of ECCEs (e.g., ECCE #i, i=0, 1, 2, . . . , $$\frac{16}{N} \times M - 1)$$

forming a corresponding EPDCCH set may be indexed in order of (i) the lowest EREG index associated with each ECCE and (ii) EPRB index. In other words, in the case that ECCEs are configured according to an EPRB mapping of Embodiment 1 above, an ECCE indexing may be sequentially performed from an ECCE associated with the lowest EREG (i.e., an EREG having the lowest EREG index) among EREGs selected from a corresponding EPRBs (i.e., EPRBs determined according to Embodiment 1 in the case of each ECCE). That is, corresponding ECCEs may be sequentially numbered (i.e., indexed) from ECCE #0. Furthermore, in the case that each ECCE is mapped to an N number of different EPRBs as described in association with Condition 1-2 above, and EREG indices selected from EPRBs forming each corresponding ECCE are the same between ECCEs, an ECCE indexing may start from an ECCE mapped to the lowest EPRB indices. EREGs forming ECCE #i in a corresponding EPDCCH set may be determined according to Formula 1 and Formula 2 below.

$$\text{For } i = 0, 1, \ldots, \frac{16}{N} \times M - 1, \quad \text{[Formula 1]}$$

$$\text{and } N \geq M,$$

$$ECCE\ \#i = \{EREG\ \#n\ of\ EPRB\ \#m\}$$

In Formula 1, m=0, 1, . . . , M−1, and n=n(i), . . . , $$n(i) + \frac{N}{M} - 1.$$

Herein, $$n(i) = i \times \frac{N}{M}.$$

$$\text{For } i = 0, 1, \ldots, \frac{16}{N} \times M - 1, \text{ and } N < M, \quad \text{[Formula 2]}$$

$$ECCE\ \#i = \{EREG\ \#n(i)\ of\ EPRB\ \#m(a)\}$$

In Formula 2, $$m(a) = \frac{M}{N}a + \left(i \bmod \frac{M}{N}\right),$$

where a=0, 1, . . . , N−1, and $$n(i) = \left[i \times \frac{N}{M}\right].$$

Herein, [x] denotes a maximum integer not exceeding x.

Figure 12:
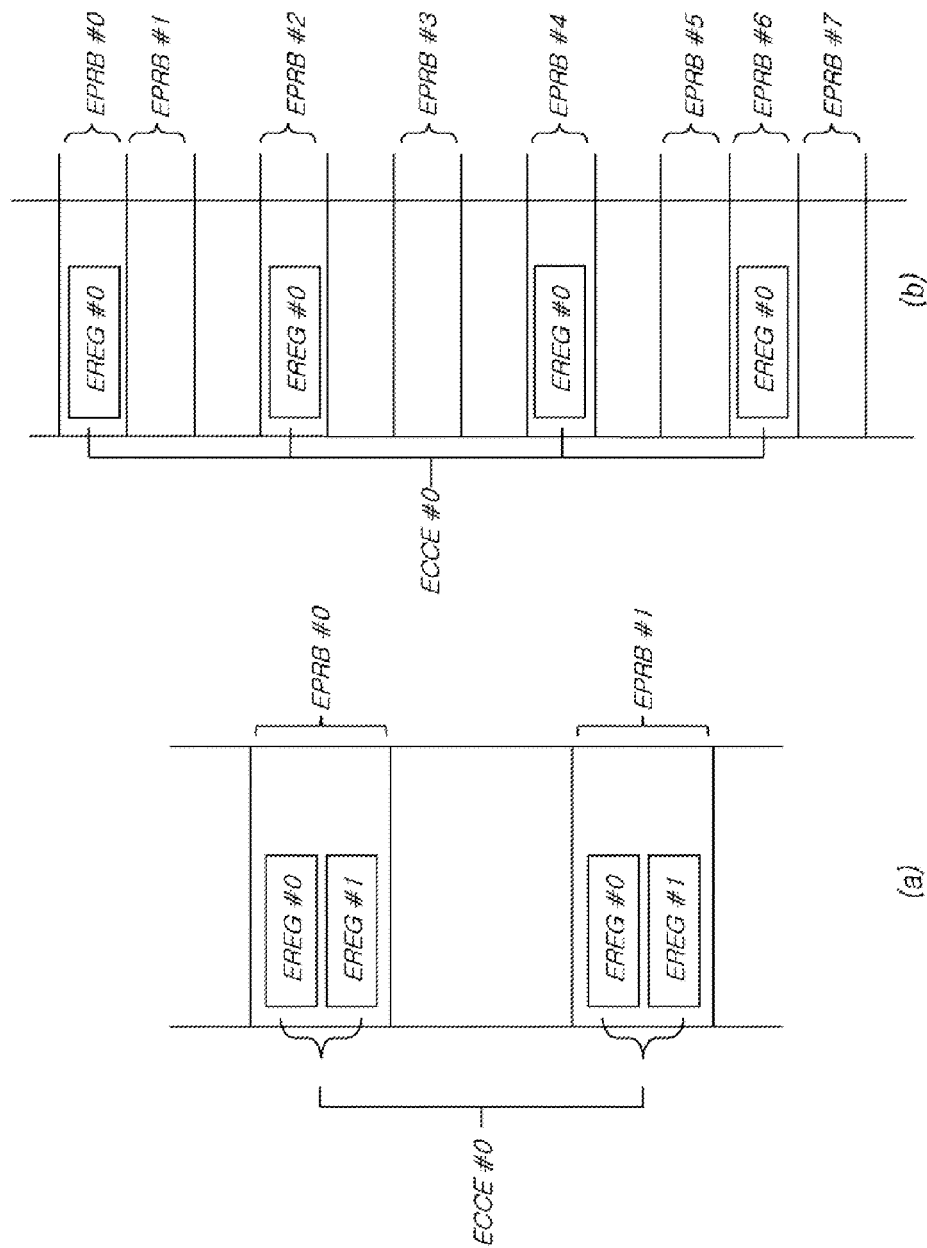
FIG. 12 illustrates an ECCE configuration in a distributed EPDCCH set according to Embodiment 2-1.

FIG. 12 illustrates an ECCE configuration in a distributed EPDCCH set according to Embodiment 2-1.

In FIG. 12, the number ("N") of EREGs constituting an ECCE may be '4' (N=4), "i" corresponding to an ECCE index (i.e., ECCE index #i) may be '0' (i=0).

FIG. 12a illustrates an ECCE configuration according to Formula 1 above. Referring to FIG. 12a, the number ("M") of EPRBs constituting an EPDCCH set may be '2' (M=2). If values of such variables (e.g., N=4, i=0, and M=2) are applied to Formula 1, $$n(i) = i \times \frac{N}{M} = 0 \times \frac{4}{2} = 0, \text{ and } n(i) + \frac{N}{M} - 1 = 1.$$

Accordingly, ECCE #0 may be {EREG #0 and EREG #1 of EPRB #0 and EPRB #1}. In other words, as shown in FIG. 12a, ECCE #0 may be configured with (i) EREG #0 and EREG #1 selected from EPRB #0, and (ii) EREG #0 and EREG #1 selected from EPRB #1.

FIG. 12b illustrates an ECCE configuration according to Formula 2 above. Referring to FIG. 12b, the number ("M") of EPRBs constituting an EPDCCH set may be '8' (M=8). If values of such variables (e.g., N=4, i=0, and M=8) are applied to Formula 2, $$n(i) = \left[i \times \frac{N}{M}\right] = \left[0 \times \frac{4}{M}\right] = [0] = 0,$$

$$\text{and } m(a) = \frac{M}{N}a + \left(i \bmod \frac{M}{N}\right) = \frac{8}{4} \times a + \left(0 \bmod \frac{8}{4}\right) = 2a + 0 = 2a.$$

For a=0, 1, 2, 3, m(a)={0, 2, 4, 6}. Accordingly, ECCE #0 may be {EREG #0 of EPRB #0, EPRB #2, EPRB #4, and EPRB #6}. In other words, as shown in FIG. 12b, ECCE #0 may be configured with (i) EREG #0 selected from EPRB #0, (ii) EREG #0 selected from EPRB #2, (iii) EREG #0 selected from EPRB #4, and (iv) EREG #0 selected from EPRB #6.

Embodiment 2-2

In another embodiment, a corresponding ECCE may be configured with 'EREGs having an shifted index' which are selected from each EPRB mapped to configure one ECCE according to Embodiment 1. According to Embodiment 1, a hopping size of EPRB indices from which EREGs constituting a certain ECCE are selected may correspond to (i) one EPRB (in the case of Condition 1-1 above) or (ii) an $$\frac{M}{N}$$

number of EPRBs (only in the case of Condition 1-2 above).

Hereinafter, the present embodiment will be specifically described in association with the above description (e.g., a hopping size). In the case that a distributed EPDCCH set consists of an M number of EPRBs (e.g., EPRB #0 to EPRB #(M-1)), EPRBs for an EREG selection (i.e., EPRBs from which EREGs are selected) may be mapped (i.e., determined) through an EPRB hopping procedure, among the M number of EPRBs. Herein, the EPRB hopping procedure may start from EREG #0 of EPRB #0, and have a hopping size according to conditions of Embodiment 1 above. EREGs to be used for configuration of an ECCE may be determined by selecting one EREG per mapped EPRB (i.e., by selecting one EREG from each of the EPRBs mapped through the EPRB hopping procedure). Particularly, in this case, an EREG index selected from a corresponding EPRB may increase by '1' whenever an EPRB hopping is performed (refer to FIG. 9b). If the last EPRB (i.e., the largest EPRB) forming a corresponding EPDCCH set is reached before mapping an $N^{th}$ EREG for configuration of a certain ECCE, an EREG mapping may be continuously performed by applying a cyclic shifting which returns to the first EPRB (i.e., the lowest EPRB) again.

In other words, in the case that a hopping size according to Embodiment 1 above is '1', i.e., in the case of N≥M (e.g., N=4 and M=3), EREG #0 may be selected from EPRB #0, EREG #1 may be selected from EPRB #1, EREG #2 may be selected from EPRB #2. After returning to EPRB #0 again, EREG #3 may be selected from EPRB #0. Accordingly, an N number of EREGs may be selected and mapped through a total of M number of EPRBs. Particularly, in the case of N>M, an EPRB (or EPRBs) may be selected one or more times.

When a first ECCE/EREG mapping for selection of an N number of EREGs is complete as described above, a second ECCE/EREG mapping may be performed from the next EPRB. More specifically, a second ECCE may be mapped through an EPRB hopping procedure and an EREG selection procedure. Herein, the EPRB hopping procedure may start from EREG #0 of EPRB #1, and have the same hopping size (i.e., the hopping size used for the first ECCE/EREG mapping). EPRBs for a mapping of the second ECCE may be determined through the EPRB hopping procedure. A total of N number of EREGs for configuration of the second ECCE may be determined (i.e., selected) by selecting one EREG per determined EPRB. Particularly, in this case, an EREG index selected from 'a corresponding EPRB' (i.e., each EPRB determined through the EPRB hopping procedure) may increase by '1' whenever an EPRB hopping is performed. In a same manner, an EREG mapping for configuration of $M^{th}$ ECCE (i.e., ECCE #(M-1)) may start from EREG #0 of EPRB #(M-1). Herein, EPRB #(M-1) may correspond to the last EPRB included in a corresponding EPDCCH set.

When a first turn (i.e., an ECCE/EREG mapping for configuration of ECCE #0 to ECCE #(M-1)) is complete as described above, EREGs (e.g., EREG #0 to EREG #(N-1)) included in each of all EPRBs (e.g., EPRB #0 to EPRB #(M-1)) forming a corresponding EPDCCH set may be used for a mapping of ECCE #0 to ECCE #(M-1). Thereafter, in a same manner, a second turn (i.e., an ECCE/EREG mapping for configuration of ECCE #M to ECCE #(2M-1)) may start from EREG #N of EPRB #0. Accordingly, ECCE #M to ECCE #(2M-1) may be mapped through the second turn.

When a $$\frac{16}{N}$$

number of turns according to an N value are performed in the above-described manner, a total of $$\frac{16}{N} \times M$$

number of ECCEs forming a corresponding EPDCCH set may be mapped.

An ECCE/EREG mapping method for configuration of a distributed EPDCCH set according to Embodiment 2-2 may be expressed by Formula 3 and Formula 4 below.

$$\text{For } i = 0, 1, \ldots, \frac{16}{N} \times M - 1, \quad \text{[Formula 3]}$$

and $N \geq M$, $ECCE \#i = \{EREG \#n(a) \text{ of } EPRB \#m(a)\}$

In Formula 3, for a=0, 1, . . . , N−1, $$m(a) = (i \bmod M) + a - M \times \left[\frac{(i \bmod M) + a}{M}\right],$$

$$\text{and } n(a) = N \times \left[\frac{i}{M}\right] + a.$$

Herein, [x] denotes a maximum integer not exceeding x.

$$\text{For } i = 0, 1, \ldots, \frac{16}{N} \times M - 1, \text{ and } N < M, \quad \text{[Formula 4]}$$
$$ECCE\ \#i = \{EREG\ \#n(a)\ of\ EPRB\ \#m(a)\}$$

In Formula 4, for a=0, 1, . . . , N−1, $$m(a) = (i \bmod M) + \frac{M}{N} \times a - M \times \left[\frac{(i \bmod M) + a}{M}\right], \text{ and}$$

$$n(a) = N \times \left[\frac{i}{M}\right] + a.$$

Herein, [x] denotes a maximum integer not exceeding x.

Figure 13:
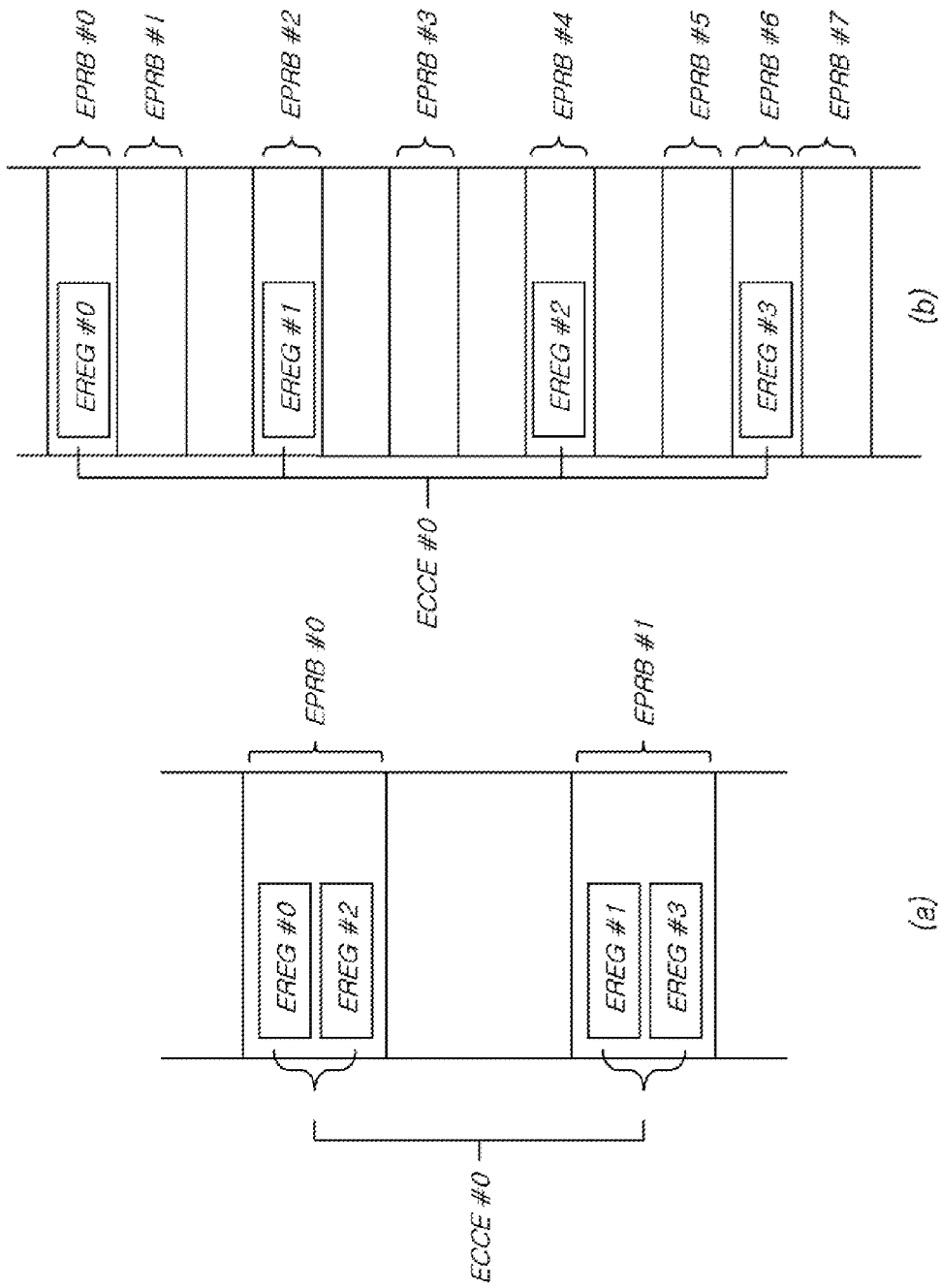
FIG. 13 illustrates an ECCE configuration in a distributed EPDCCH set according to Embodiment 2-2.

FIG. 13 illustrates an ECCE configuration in a distributed EPDCCH set according to Embodiment 2-2.

In FIG. 13, the number ("N") of EREGs constituting an ECCE may be '4' (N=4), "i" corresponding to an ECCE index (i.e., ECCE index #i) may be '0' (i=0).

FIG. 13a illustrates an ECCE configuration according to Formula 3 above. Referring to FIG. 13a, the number ("M") of EPRBs constituting an EPDCCH set may be '2' (M=2). If values of such variables (e.g., N=4, i=0, and M=2) are applied to Formula 3, (i) m(0)=0 and n(0)=0 (for a=0), (ii) m(1)=1 and n(1)=1 (for a=1), (iii) m(2)=0 and n(2)=2 (for a=2), and (iv) m(3)=1 and n(3)=3 (for a=3). Accordingly, ECCE #0 may be {EREG #0 of EPRB #0, EREG #1 of EPRB #1, EREG #2 of EPRB #0, EREG #3 of EPRB #1}. In other words, as shown in FIG. 13a, EREG #0 may be selected from EPRB #0, and EREG #1 may be selected from EPRB #1. Thereafter, EREG #2 may be selected from EPRB #0, and EREG #3 may be selected from EPRB #1. ECCE #0 may be configured with the selected EREGs.

FIG. 13b illustrates an ECCE configuration according to Formula 4 above. Referring to FIG. 13b, the number ("M") of EPRBs constituting an EPDCCH set may be '8' (M=8). If values of such variables (e.g., N=4, i=0, and M=8) are applied to Formula 4, (i) m(0)=0 and n(0)=0 (for a=0), (ii) m(1)=2 and n(1)=1 (for a=1), (iii) m(2)=4 and n(2)=2 (for a=2), and (iv) m(3)=6 and n(3)=3 (for a=3). Accordingly, ECCE #0 may be {EREG #0 of EPRB #0, EREG #1 of EPRB #2, EREG #2 of EPRB #4, EREG #3 of EPRB #6}. In other words, as shown in FIG. 13b, (i) EREG #0 may be selected from EPRB #0, (ii) EREG #1 may be selected from EPRB #2, (iii) EREG #2 may be selected from EPRB #4, and (iv) EREG #3 may be selected from EPRB #6. ECCE #0 may be configured with the selected EREGs.

Embodiment 2-3

In a similar manner to Embodiment 2-2, a total of N number of EREGs may be selected and mapped by selecting one EREG from each EPRB determined through an EPRB hopping. However, unlike Embodiment 2-2, an EREG selecting/mapping procedure may be performed by selecting an EREG index increased by $$\frac{16}{N}$$

according to an 'N' value, in place of selecting an EREG index increased by '1', whenever an EPRB hopping is performed. In other words, in the case that a distributed EPDCCH set includes an M number of EPRBs (e.g., EPRB #0 to EPRB #(M−1)), EPRBs for an EREG selection (i.e., EPRBs from which EREGs are selected) may be mapped (i.e., determined) through an EPRB hopping procedure, among the M number of EPRBs. Herein, the EPRB hopping procedure may start from EREG #0 of EPRB #0, and have a hopping size according to conditions of Embodiment 1 above. EREGs to be used for configuration of an ECCE may be determined by selecting one EREG per mapped EPRB (i.e., by selecting one EREG from each of the EPRBs mapped through the EPRB hopping procedure).

In this case, according to Embodiment 2-2 above, an EREG index selected from 'a corresponding EPRB' (i.e., each EPRB determined through an EPRB hopping procedure may increase by '1' whenever an EPRB hopping is performed. However, according to Embodiment 2-3, the EREG index selected from the corresponding EPRB may increase by $$\frac{16}{N}$$

(determined by an N value) whenever an EPRB hopping is performed. Herein, the $$\frac{16}{N}$$

may be referred to as "an EREG hopping size." For example, in the case that the number ("M") of EPRBs assigned for configuration of a distributed EPDCCH set is 8 (i.e., M=8), and the EPDCCH set is configured in a normal downlink subframe with a normal CP (i.e., N=4), an EPRB hopping size may be determined as $$\frac{M}{N} = 2$$

according to a condition of Embodiment 1 above. Furthermore, in the case of configuring ECCEs according to Embodiment 2-3, an EREG hopping size used to select EREGs from EPRBs constituting each ECCE may be determined as $$\frac{16}{4} = 4.$$

Accordingly, a first ECCE (i.e., ECCE #0) forming a corresponding EPDCCH set may consist of (i) EREG #0 of EPRB #0, (ii) EREG #4 of EPRB #2, (iii) EREG #8 of EPRB #4, and (iv) EREG #12 of EPRB #6. Similarly, a second ECCE (i.e., ECCE #1) forming a corresponding EPDCCH set may consist of (i) EREG #0 of EPRB #1, (ii) EREG #4 of EPRB #3, (iii) EREG #8 of EPRB #5, and (iv) EREG #12 of EPRB #7. In a same manner, the last ECCE of a first turn, i.e., $M^{th}$ ECCE (i.e., ECCE #(M−1)) in a corresponding EPDCCH set may be configured with (i) EREG #0 of EPRB #7, (ii) EREG #4 of EPRB #1, (iii) EREG #8 of EPRB #3, and (iv) EREG #12 of EPRB #5. In the present example, ECCE #7 correspond to ECCE #(M−1).

When a first turn (i.e., an ECCE/EREG mapping for configuration of ECCE #0 to ECCE #(M−1)) is complete as described above, 'EREGs having EREG indices corresponding to [a value of "modulo $\frac{16}{N}$"

operation=0]' among EREGs included in all EPRBs (e.g., EPRB #0 to EPRB #(M−1)) forming a corresponding EPDCCH set may be used for a mapping of an M number of ECCEs (e.g., ECCE #0 to ECCE #(M−1)). Herein, the 'EREGs having EREG indices corresponding to [a value of "modulo $\frac{16}{N}$"

operation=0]' may represent EREGs having EREG indices corresponding to [a modulo value=0] when a "modulo $\frac{16}{N}$"

operation (e.g., in the present example, a "modulo 4" operation) is applied to each EREG index. The 'M' may be '8' in the present example.

In a second turn (i.e., an ECCE/EREG mapping for configuration of ECCE #M to ECCE #(2M−1)), a corresponding ECCE mapping may start from $(M+1)^{th}$ ECCE (i.e., ECCE #M) and end at $2M^{th}$ ECCE (i.e., ECCE #(2M−1)) in a same manner. Herein, $(M+1)^{th}$ ECCE (i.e., ECCE #M) may be mapped to (i) EREG #1 of EPRB #0, (ii) EREG #5 of EPRB #2, (iii) EREG #9 of EPRB #4, and (iv) EREG #13 of EPRB #6. $2M^{th}$ ECCE (i.e., ECCE #(2M−1)) may be mapped to (i) EREG #1 of EPRB #7, (ii) EREG #5 of EPRB #1, (iii) EREG #9 of EPRB #3, and (iv) EREG #13 of EPRB #5.

When a $$\frac{16}{N}$$

number of turns according to an N value are performed in the above-described manner, a total of $$\frac{16}{N} \times M$$

number of ECCEs forming a corresponding EPDCCH set may be mapped. In this case, if the last EPRB (i.e., the largest EPRB) included in a corresponding EPDCCH set is reached before mapping an $N^{th}$ EREG for configuration of a certain ECCE, an EREG mapping may be continuously performed by applying a cyclic shifting which returns to the first EPRB (i.e., the lowest EPRB) again.

An ECCE/EREG mapping method for configuration of a distributed EPDCCH set according to Embodiment 2-3 may be expressed by Formula 5 and Formula 6 below.

$$\text{For } i = 0, 1, \ldots, \frac{16}{N} \times M - 1, \text{ and } N \geq M, \quad \text{[Formula 5]}$$

$$ECCE\ \#i = \{EREG\ \#n(a)\ of\ EPRB\ \#m(a)\}$$

In Formula 5, for a=0, 1, . . . , N−1, $$m(a) = (i \bmod M) + a - M \times \left[\frac{(i \bmod M) + a}{M}\right], \text{ and } n(a) = N \times \left[\frac{i}{M}\right] + \frac{16}{N} \times a.$$

Herein, [x] denotes a maximum integer not exceeding x.

$$\text{For } i = 0, 1, \ldots, \frac{16}{N} \times M - 1, \text{ and } N < M, \quad \text{[Formula 6]}$$

$$ECCE\ \#i = \{EREG\ \#n(a)\ of\ EPRB\ \#m(a)\}$$

In Formula 6, for a=0, 1, . . . , N−1, $$m(a) = (i \bmod M) + \frac{M}{N} \times a - M \times \left[\frac{(i \bmod M) + a}{M}\right],$$

$$\text{and } n(a) = N \times \left[\frac{i}{M}\right] + \frac{16}{N} \times a.$$

Herein, [x] denotes a maximum integer not exceeding x.

Figure 14:
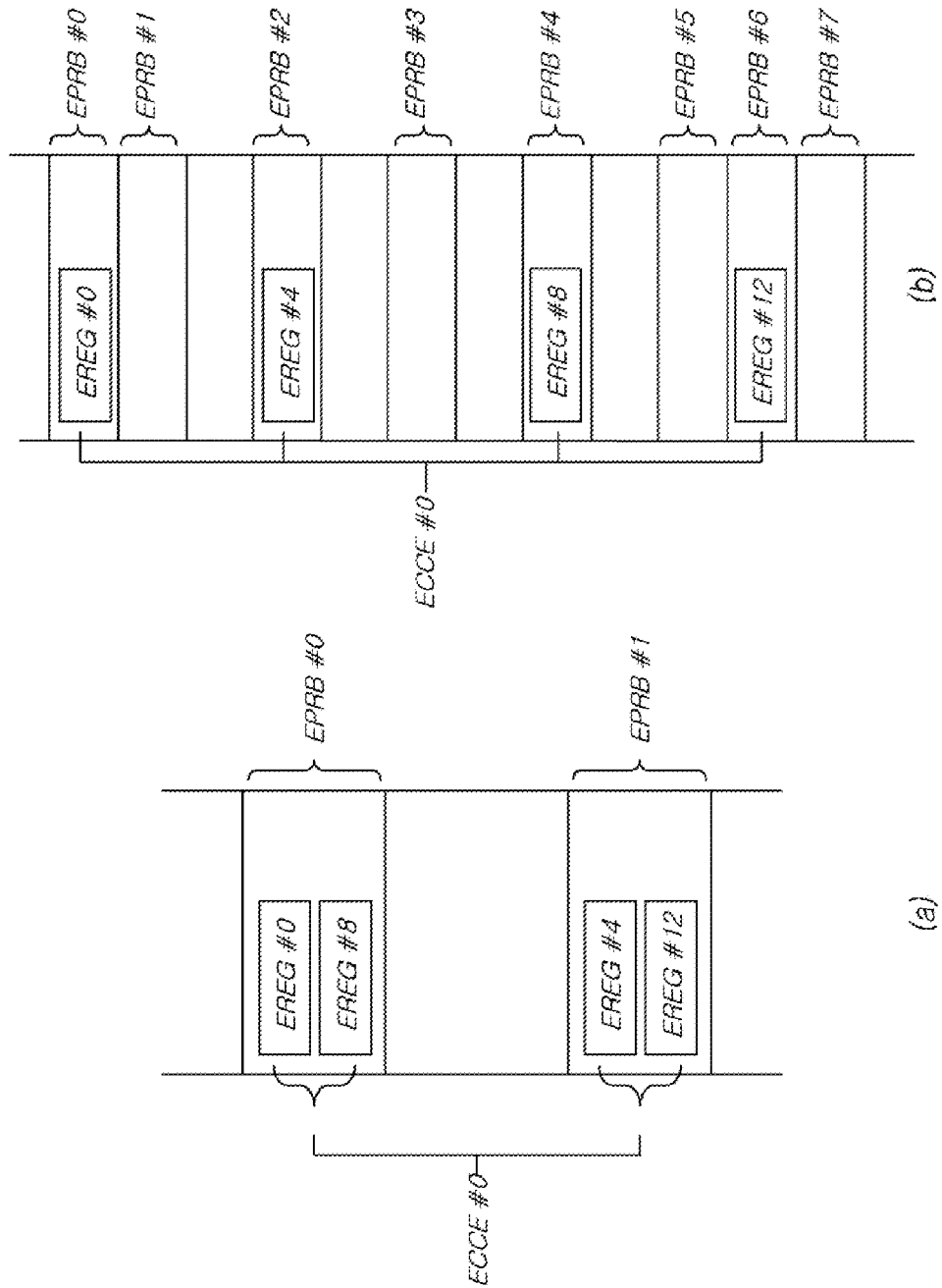
FIG. 14 illustrates an ECCE configuration in a distributed EPDCCH set according to Embodiment 2-3.

FIG. 14 illustrates an ECCE configuration in a distributed EPDCCH set according to Embodiment 2-3.

In FIG. 14, the number ("N") of EREGs constituting an ECCE may be '4' (N=4), "i" corresponding to an ECCE index (i.e., ECCE index #i) may be '0' (i=0).

FIG. 14a illustrates an ECCE configuration according to Formula 5 above. Referring to FIG. 14a, the number ("M") of EPRBs forming an EPDCCH set may be '2' (M=2). If values of such variables (e.g., N=4, i=0, and M=2) are applied to Formula 5, (i) m(0)=0 and n(0)=0 (for a=0), (ii) m(1)=1 and n(1)=4 (for a=1), (iii) m(2)=0 and n(2)=8 (for a=2), and (iv) m(3)=1 and n(3)=12 (for a=3). Accordingly, ECCE #0 may be {EREG #0 of EPRB #0, EREG #4 of EPRB #1, EREG #8 of EPRB #0, EREG #12 of EPRB #1}. In other words, as shown in FIG. 14a, EREG #0 may be selected from EPRB #0, and EREG #4 may be selected from EPRB #1. Thereafter, EREG #8 may be selected from EPRB #0, and EREG #12 may be selected from EPRB #1. ECCE #0 may be configured with the selected EREGs.

FIG. 14b illustrates an ECCE configuration according to Formula 6 above. Referring to FIG. 14b, the number ("M") of EPRBs forming an EPDCCH set may be '8' (M=8). If values of such variables (e.g., N=4, i=0, and M=8) are applied to Formula 6, then (i) m(0)=0 and n(0)=0 (for a=0), (ii) m(1)=2 and n(1)=4 (for a=1), (iii) m(2)=4 and n(2)=8 (for a=2), and (iv) m(3)=6 and n(3)=12 (for a=3). Accordingly, ECCE #0 may be {EREG #0 of EPRB #0, EREG #4 of EPRB #2, EREG #8 of EPRB #4, EREG #12 of EPRB #6}. In other words, as shown in FIG. 14b, (i) EREG #0 may be selected from EPRB #0, (ii) EREG #4 may be selected from EPRB #2, (iii) EREG #8 may be selected from EPRB #4, and (iv) EREG #12 may be selected from EPRB #6. ECCE #0 may be configured with the selected EREGs.

As described above, among resource elements (REs) constituting EREGs, there might be REs unavailable for an EPDCCH transmission because of a size of a legacy PDCCH control region and the presence of reference signals (e.g., CRS etc.). Accordingly, there may be an imbalance in the number of REs available for an EPDCCH transmission per EREG. Hereinafter, in the case that ECCEs are configured according to Embodiment 2-2 and Embodiment 2-3, the number of available REs per ECCE will be described in more detail.

If a size of a legacy PDCCH control region is '2' OFDM symbols, in this case, the number of available REs may be as described in Table 3 above.

In such case, according to Embodiment 2-2, ECCEs may be configured by increasing EREG index (i.e., an index of an EREG to be selected in a corresponding EPRB) by '1'. Table 4 below may represent the number of available REs per ECCE, in the case that ECCEs are configured according to Embodiment 2-2.

TABLE 4

| EREG indices constituting ECCEs | 1 Tx CRS | 2 Tx CRS | 4 Tx CRS |
|---|---|---|---|
| EREG #0~EREG #3 | 25 REs | 23 REs | 22 REs |
| EREG #4~EREG #7 | 28 REs | 27 REs | 25 REs |
| EREG #8~EREG #11 | 30 REs | 28 REs | 28 REs |
| EREG #12~EREG #15 | 31 REs | 30 REs | 29 REs |

Referring to Table 4, in the case of one transmission antenna port ("1 Tx CRS"), an ECCE consisting of EREG #0 to EREG #3 may include 25 available REs, and an ECCE consisting of EREG #12 to EREG #15 may include 31 available REs. Accordingly, an available RE difference between the two ECCEs may be '6'.

Similarly, in the case that a size of a legacy PDCCH control region is '2' OFDM symbols, Table 5 below may represent the number of available REs of ECCEs configured according to Embodiment 2-3.

TABLE 5

| EREG indices constituting ECCEs | 1 Tx CRS | 2 Tx CRS | 4 Tx CRS |
|---|---|---|---|
| EREG #0, EREG #4, EREG #8, EREG #12 | 28 REs | 27 REs | 26 REs |
| EREG #1, EREG #5, EREG #9, EREG #13 | 29 REs | 27 REs | 26 REs |
| EREG #2, EREG #6, EREG #10, EREG #14 | 28 REs | 27 REs | 26 REs |
| EREG #3, EREG #7, EREG #11, EREG #15 | 29 REs | 27 REs | 26 REs |

Referring to Table 5, in the case of one transmission antenna port ("1 Tx CRS"), an ECCE consisting of EREG #0, EREG #4, EREG #8, and EREG #12 may include 28 available REs. An ECCE consisting of EREG #1, EREG #5, EREG #9, and EREG #13 may include 29 available REs. Accordingly, an available RE difference between the two ECCEs may be '1'. Such available RE difference (e.g., 1) in the case of Embodiment 2-3 may be less than the available RE difference (e.g., 6) in the case of Embodiment 2-2. Furthermore, in the case of two transmission antenna ports ("2 Tx CRS") and four transmission antenna ports ("4 Tx CRS"), an available RE difference between the ECCEs configured according to Embodiment 2-3 may be '0'.

In Embodiment 2, embodiments combined with Embodiment 1 were described. However, the present embodiment is not limited thereto. Furthermore, embodiments described in Embodiment 2 may be independent from Embodiment 1.

For example, according to Embodiment 2-1, an ECCE may be configured with EREGs having an identical index. In the case of an EPDCCH set consisting of 8 EPRBs, one ECCE may be configured by selecting EREGs (e.g., an EREG corresponding to EREG #0) having an identical index, from EPRB #0, EPRB #2, EPRB #4, and EPRB #6. However, Embodiment 2-1 may be independent from Embodiment 1. Accordingly, in this case, one ECCE may be configured by selecting EREGs (e.g., an EREG corresponding to EREG #0) having an identical index, from four consecutive EPRBs (e.g., EPRB #0, EPRB #1, EPRB #2, and EPRB #3).

Other examples associated with Embodiment 2 independent from Embodiment 1 will be described hereinafter. According to Embodiment 2-2, one ECCE may be configured with EREGs corresponding to consecutive indices (e.g., EREG #0, EREG #1, EREG #2, EREG #3). In the case of an EPDCCH set consisting of 2 EPRBs, one ECCE may be configured with (i) EREG #0 selected from EPRB #0, (ii) EREG #1 selected from EPRB #1, (iii) EREG #2 selected from EPRB #0, and (iv) EREG #3 selected from EPRB #1. However, Embodiment 2-2 may be independent from Embodiment 1. In this case, one ECCE may be configured by (i) selecting EREG #0 from EPRB #0, and (ii) selecting EREG #1, EREG #2 and EREG #3 from EPRB #1.

Similarly, Embodiment 2-3 may be independent from Embodiment 1. More specifically, an ECCE may be configured by selecting EREG indices sequentially increased by $$\frac{16}{N},$$

without an EPRB hopping. For example, in the case of an EPDCCH set consisting of 2 EPRBs, one ECCE may be configured by selecting (i) EREG #0, EREG 4, and EREG #8 from EPRB #0, and (ii) EREG #12 from EPRB #1.

As described above, Embodiment 1 and Embodiment 2 may provide methods of performing an ECCE/EREG mapping in a distributed EPDCCH set. In Embodiment 2-1, an ECCE/EREG mapping function may be defined by Formula 1 and Formula 2. In Embodiment 2-2, an ECCE/EREG mapping function may be defined by Formula 3 and Formula 4. In Embodiment 2-3, an ECCE/EREG mapping function may be defined by Formula 5 and Formula 6. However, Formula 1 to Formula 6 represent exemplary functional formulas defined according to each embodiment, and may be expressed as other types of functional formulas based on concepts of Embodiment 2-1, Embodiment 2-2, and Embodiment 2-3.

Figure 15:
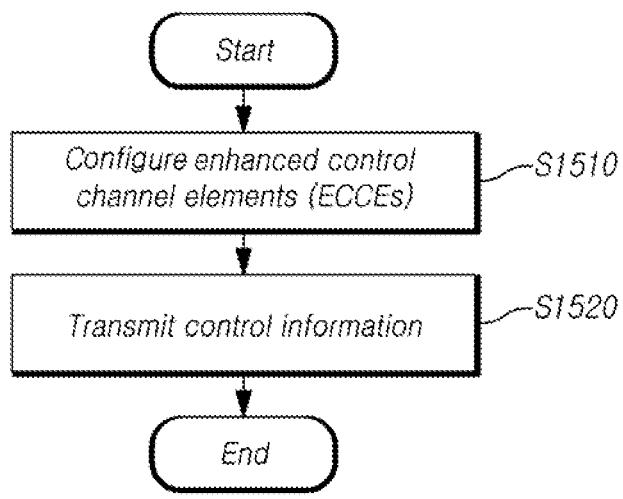
FIG. 15 is a flowchart illustrating a method of transmitting control information in a transmission/reception point in accordance with at least one embodiment.

FIG. 15 is a flowchart illustrating a method (1500) of transmitting control information in a transmission/reception point in accordance with at least one embodiment.

Referring to FIG. 15, the transmission/reception point may transmit control information to user equipment through data regions of two or more physical resource-block (PRB) pairs in a subframe. At step S1510, the transmission/reception point may configure (or form) enhanced control channel elements (ECCEs) (or may otherwise be referred to as "assign ECCEs"). Herein, resource elements (REs) in each of the two or more PRB pairs may be indexed by repetitively using 16 numbers (e.g., 0, 1, 2, . . . , 15) according to a frequency-first scheme (i.e., a frequency first and then time manner). Resource elements (REs) having an identical index may be included in an identical enhanced resource-element group (EREG). Each ECCE may include EREGs (e.g., 4 or 8 EREGs) corresponding to EREG indices having an identical modulo value. More specifically, each of the ECCEs configured at step S1510 may be configured with (i) 4 EREGs corresponding to different EREG indices having an identical remainder (e.g., 0, 1, 2, or 3) when the different EREG indices are divided by 4, or (ii) 8 EREGs corresponding to different EREG indices having an identical remainder (e.g., 0 or 1) when the different EREG indices are divided by 2.

At step S1510, EREGs forming an ECCE may be located in two or more PRB pairs.

Examples of indices assigned to a PRB pair were described with reference to FIG. 4 to FIG. 9. Referring to FIG. 4 and FIG. 7, EREGs may be numbered (i.e., indexed) from 0 to 15 according to a frequency-first scheme (i.e., a frequency first and then time manner). In embodiments shown in FIG. 4, indexing may be performed using a symbol-based cyclic shift. More specifically, as shown in FIG. 4, after a resource element (RE) indicated by "400" in the first symbol is indexed as 11 (i.e., index 11), a neighboring RE indicated by "410" in the second symbol is continuously indexed as 12 (i.e., index 12). Meanwhile, in embodiments shown in FIG. 7, indexing may be performed without a symbol-based cyclic shift. Accordingly, in this case, as shown in FIG. 7, after a resource element (RE) indicated by "700" in the first symbol is indexed as 11 (i.e., index 11), an RE indicated by "710" in the second symbol is continuously indexed as 12 (i.e., index 12). Herein, the RE ("710") indexed as 12 is not adjacent to the RE ("700") indexed as 11.

The transmission/reception point may constitute an ECCE using (i) EREGs corresponding to different EREG indices having an identical remainder (e.g., 0, 1, 2, or 3) when the different EREG indices are divided by 4, or (ii) EREGs corresponding to different EREG indices having an identical remainder (e.g., 0 or 1) when the different EREG indices are divided by 2.

For example, ECCEs may be configured with EREGs corresponding to different EREG indices having an identical remainder (e.g., 0, 1, 2, or 3) when the different EREG indices are divided by 4. More specifically, one ECCE may consist of EREG #0, EREG #4, EREG #8, and EREG #12. Another ECCE may consist of EREG #1, EREG #5, EREG #9, and EREG #13. Another ECCE may consist of EREG #2, EREG #6, EREG #10, and EREG #14. The other ECCE may consist of EREG #3, EREG #7, EREG #11, and EREG #15. Furthermore, an EREG index group corresponding to each ECCE may be expressed as {0, 4, 8, 12}, {1, 5, 9, 13}, {2, 6, 10, 14}, or {3, 7, 11, 15}.

In other embodiments, in the case that ECCEs are configured with EREGs corresponding to different EREG indices having an identical remainder (e.g., 0 or 1) when the different EREG indices are divided by 2, one ECCE may consist of EREG #0, EREG #2, EREG #4, EREG #6, EREG #8, EREG #10, EREG #12, and EREG #14. The other ECCE may consist of EREG #1, EREG #3, EREG #5, EREG #7, EREG #9, EREG #11, EREG #13, and EREG #15. Furthermore, an EREG index group corresponding to each ECCE may be expressed as {0, 2, 4, 6, 8, 10, 12, 14} or {1, 3, 5, 7, 9, 11, 13, 15}.

EREGs constituting an ECCE may be located in two or more PRB pairs. That is, EPDCCH may be transmitted according to a distributed type. More specifically, in the transmission/reception point, PRB pairs assigning ECCEs may form an EPDCCH set of a distributed type (i.e., a distributed EPDCCH set).

The transmission/reception point may configure (or assign) an ECCE by distributing EREGs to PRB pairs such that a frequency diversity gain is maximum. Such ECCE configuration method may be embodied according to Embodiment 1, and is not limited thereto.

Referring back to FIG. 11, a transmission/reception point may configure an ECCE by selecting EREGs in each of EPRB #2, EPRB #4, and EPRB #6 while hopping every two PRB pairs from EPRB #0 in 8 PRB pairs. The transmission/reception point may configure (or assign) the ECCE using EREGs of 'the PRB pairs determined by the hopping procedure' (e.g., EPRB #0, EPRB #2, EPRB #4, and EPRB #6). More specifically, as described above, the transmission/reception point may configure one ECCE using (i) EREGs corresponding to different EREG indices having an identical remainder when the different EREG indices are divided by 4, or (ii) EREGs corresponding to different EREG indices having an identical remainder when the different EREG indices are divided by 2.

In more detail, EREG #0 may be selected from EPRB #0, EREG #4 may be selected from EPRB #2, EREG #8 may be selected from EPRB #4, and EREG #12 may be selected from EPRB #16. The selected EREGs may constitute an ECCE. In other embodiments, an ECCE may be configured by selecting (i) EREG #12 from EPRB #0, (ii) EREG #8 from EPRB #2, (iii) EREG #4 from EPRB #4, and (iv) EREG #0 from EPRB #6.

In the case that EREG indices are restricted to [0, 1, 2, . . . , 15], (i) a combination of EREGs corresponding to different EREG indices having an identical remainder when the different EREG indices are divided by 4, or (ii) a combination of EREGs corresponding to different EREG indices having an identical remainder when the different EREG indices are divided by 2 may be restricted. Considering such combination, EREG indices (may be referred to as "an EREG index group") assigned to an ECCE may be one of {0, 4, 8, 12}, {1, 5, 9, 13}, {2, 6, 10, 14}, and {3, 7, 11, 15}. Alternatively, the EREG index group assigned to the ECCE may be one of {0, 2, 4, 6, 8, 10, 12, 14} and {1, 3, 5, 7, 9, 11, 13, 15}.

Referring back to FIG. 15, at step S1520, the transmission/reception point may transmit the control information to the user equipment, through at least one of the configured ECCEs.

Herein, the control information may be transmitted through EPDCCH corresponding to a control channel defined in a data region 220. The EPDCCH may be assigned to at least one ECCE in PRB pairs.

Figure 16:
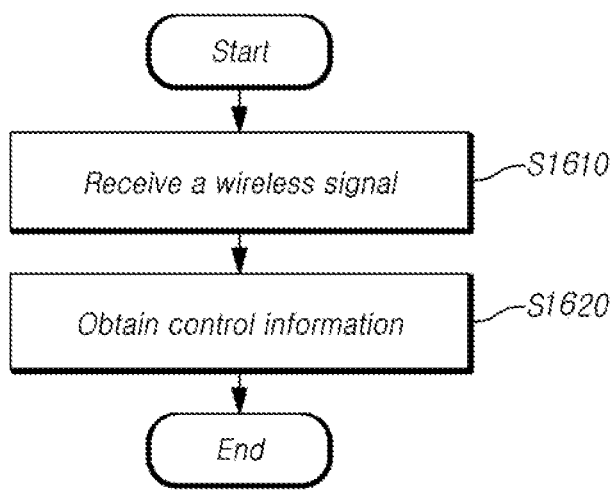
FIG. 16 is a flowchart illustrating a method of receiving control information in user equipment in accordance with other embodiments.

FIG. 16 is a flowchart illustrating a method of receiving control information in user equipment in accordance with other embodiments.

Referring to FIG. 16, the user equipment may receive control information from a transmission/reception point, through data regions of two or more PRB pairs in a subframe.

At step S1610, the user equipment may receive a wireless signal (may be referred to as "a radio signal") through at least one ECCE. Herein, resource elements (REs) in each of the two or more PRB pairs may be indexed by repetitively using 16 numbers (e.g., 0, 1, 2, . . . , 15) according to a frequency-first scheme (i.e., a frequency first and then time manner). Resource elements (REs) having an identical index may be included in an identical EREG. Each of the at least one ECCE may include EREGs corresponding to EREG indices having an identical modulo value. More specifically, each of the at least one ECCE may be configured with (i) 4 EREGs corresponding to different EREG indices having an identical remainder (e.g., 0, 1, 2, or 3) when the different EREG indices are divided by 4, or (ii) 8 EREGs corresponding to different EREG indices having an identical remainder (e.g., 0 or 1) when the different EREG indices are divided by 2. Furthermore, at step S1620, the user equipment may obtain the control information from the received wireless signal.

At step S1610, EREGs forming an ECCE may be located in two or more PRB pairs.

Examples of indices assigned to a PRB pair were described with reference to FIG. 4 to FIG. 9. Referring to FIG. 4 and FIG. 7, EREGs may be numbered (i.e., indexed) from 0 to 15 according to a frequency-first scheme (i.e., a frequency first and then time manner). In embodiments shown in FIG. 4, indexing may be performed using a symbol-based cyclic shift. More specifically, as shown in FIG. 4, after a resource element (RE) indicated by "400" in the first symbol is indexed as 11 (i.e., index 11), a neighboring RE indicated by "410" in the second symbol is continuously indexed as 12 (i.e., index 12). Meanwhile, in embodiments shown in FIG. 7, indexing may be performed without a symbol-based cyclic shift. Accordingly, in this case, as shown in FIG. 7, after a resource element (RE) indicated by "700" in the first symbol is indexed as 11 (i.e., index 11), an RE indicated by "710" in the second symbol is continuously indexed as 12 (i.e., index 12). Herein, the RE ("710") indexed as 12 is not adjacent to the RE ("700") indexed as 11.

An ECCE may be configured with (i) EREGs corresponding to different EREG indices having an identical remainder (e.g., 0, 1, 2, or 3) when the different EREG indices are divided by 4, or (ii) EREGs corresponding to different EREG indices having an identical remainder (e.g., 0 or 1) when the different EREG indices are divided by 2. In other words, such EREGs may be assigned for an ECCE configuration.

For example, ECCEs may be configured with EREGs corresponding to different EREG indices having an identical remainder (e.g., 0, 1, 2, or 3) when the different EREG indices are divided by 4. More specifically, one ECCE may consist of EREG #0, EREG #4, EREG #8, and EREG #12. Another ECCE may consist of EREG #1, EREG #5, EREG #9, and EREG #13. Another ECCE may consist of EREG #2, EREG #6, EREG #10, and EREG #14. The other ECCE may consist of EREG #3, EREG #7, EREG #11, and EREG #15. Furthermore, an EREG index group corresponding to each ECCE may be expressed as {0, 4, 8, 12}, {1, 5, 9, 13}, {2, 6, 10, 14}, or {3, 7, 11, 15}.

In other embodiments, in the case that ECCEs are configured with EREGs corresponding to different EREG indices having an identical remainder (e.g., 0 or 1) when the different EREG indices are divided by 2, one ECCE may consist of EREG #0, EREG #2, EREG #4, EREG #6, EREG #8, EREG #10, EREG #12, and EREG #14. The other ECCE may consist of EREG #1, EREG #3, EREG #5, EREG #7, EREG #9, EREG #11, EREG #13, and EREG #15. Furthermore, an EREG index group corresponding to each ECCE may be expressed as {0, 2, 4, 6, 8, 10, 12, 14} or {1, 3, 5, 7, 9, 11, 13, 15}.

EREGs constituting an ECCE may be located in two or more PRB pairs. That is, EPDCCH may be transmitted according to a distributed type. More specifically, PRB pairs assigning ECCEs may constitute an EPDCCH set of a distributed type (i.e., a distributed EPDCCH set).

EREGs may be distributively assigned to PRB pairs such that a frequency diversity gain is at a relatively maximum value. Such EREG assignment method may be embodied according to Embodiment 1, and is not limited thereto.

Referring back to FIG. 11, an ECCE may be configured with EREGs selected from each of EPRB #2, EPRB #4, and EPRB #6 while hopping every two PRB pairs from EPRB #0 in 8 PRB pairs. An ECCE may be configured with EREGs of 'the PRB pairs determined by the hopping procedure' (e.g., EPRB #0, EPRB #2, EPRB #4, and EPRB #6). More specifically, as described above, an ECCE may be configured with (i) EREGs corresponding to different EREG indices having an identical remainder when the different EREG indices are divided by 4, or (ii) EREGs corresponding to different EREG indices having an identical remainder when the different EREG indices are divided by 2.

In more detail, EREG #0 may be selected from EPRB #0, EREG #4 may be selected from EPRB #2, EREG #8 may be selected from EPRB #4, and EREG #12 may be selected from EPRB #6. The selected EREGs may constitute an ECCE. In other embodiments, an ECCE may be configured by selecting (i) EREG #12 from EPRB #0, (ii) EREG #8 from EPRB #2, (iii) EREG #4 from EPRB #4, and (iv) EREG #0 from EPRB #6.

In the case that EREG indices are restricted to [0, 1, 2, . . . , 15], (i) a combination of EREGs corresponding to different EREG indices having an identical remainder when the different EREG indices are divided by 4, or (ii) a combination of EREGs corresponding to different EREG indices having an identical remainder when the different EREG indices are divided by 2 may be restricted. Considering such combination, EREG indices (i.e., "an EREG index group") assigned to an ECCE may be one of {0, 4, 8, 12}, {1, 5, 9, 13}, {2, 6, 10, 14}, and {3, 7, 11, 15}. Alternatively, the EREG index group assigned to the ECCE may be one of {0, 2, 4, 6, 8, 10, 12, 14} and {1, 3, 5, 7, 9, 11, 13, 15}.

Figure 17:
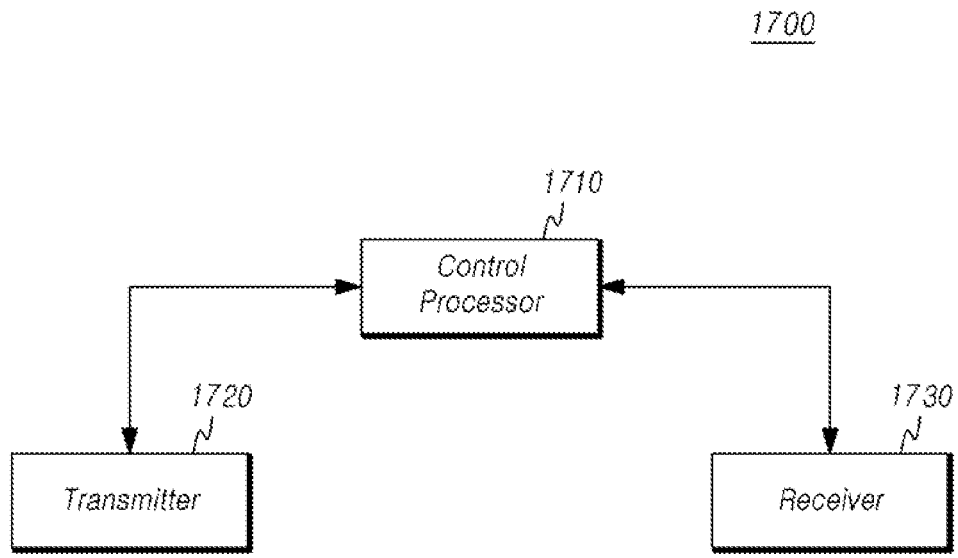
FIG. 17 is a diagram illustrating a transmission/reception point in accordance with some embodiments.

Referring back to FIG. 16, at step S1620, the user equipment may then obtain the control information FIG. 17 is a diagram illustrating a transmission/reception point in accordance with some embodiments.

Referring to FIG. 17, transmission/reception point 1700 according to the present embodiment may transmit control information to user equipment through data regions in two or more PRB pairs in a subframe. Transmission/reception point 1700 according to the present embodiment may include control processor 1710, transmitter 1720, and receiver 1730.

Control processor 1710 may configure (or form) ECCEs (or referred to herein as "assign ECCEs"). More specifically, resource elements (REs) in each of the two or more PRB pairs may be indexed by repetitively using 16 numbers (e.g., 0, 1, 2, . . . , 15) according to a frequency-first scheme (i.e., a frequency first and then time manner). Resource elements (REs) having an identical index may be included in an identical enhanced resource-element group (EREG). Each ECCE may include EREGs (e.g., 4 or 8 EREGs) corresponding to EREG indices having an identical modulo value. In more detail, control processor 1710 may configure each ECCE, using (i) 4 EREGs corresponding to different EREG indices having an identical remainder (e.g., 0, 1, 2, or 3) when the EREG indices are divided by 4, or (ii) 8 EREGs corresponding to different EREG indices having an identical remainder (e.g., 0 or 1) when the EREG indices are divided by 2.

Control processor 1710 may control 'an ECCE configuration' (or may be referred to as "an ECCE assignment") such that EREGs constituting an ECCE are located in two or more PRB pairs. That is, EPDCCH may be transmitted according to a distributed type. More specifically, in transmission/reception point 1700, PRB pairs assigning ECCEs may form an EPDCCH set of a distributed type (i.e., a distributed EPDCCH set).

In the case that EREG indices are restricted to [0, 1, 2, . . . , 15], (i) a combination of EREGs corresponding to different EREG indices having an identical remainder when the different EREG indices are divided by 4, or (ii) a combination of EREGs corresponding to different EREG indices having an identical remainder when the different EREG indices are divided by 2 may be restricted. Considering such combination, EREG indices (may be referred to as "an EREG index group") assigned to an ECCE may be one of {0, 4, 8, 12}, {1, 5, 9, 13}, {2, 6, 10, 14}, and {3, 7, 11, 15}. Alternatively, the EREG index group assigned to the ECCE may be one of {0, 2, 4, 6, 8, 10, 12, 14} and {1, 3, 5, 7, 9, 11, 13, 15}.

In addition, control processor 1710 may control operations of transmission/reception point 1700, according to a method of performing an ECCE/EREG mapping for an EPDCCH transmission and/or a method of performing an ECCE indexing in a certain distributed EPDCCH set.

Transmitter 1720 may transmit the control information to the user equipment, through at least one of the configured ECCEs.

Transmitter 1720 and receiver 1730 may respectively transmit and receive signals, messages, and/or data required for performing the above-described present embodiments, in connection with the user equipment.

Figure 18:
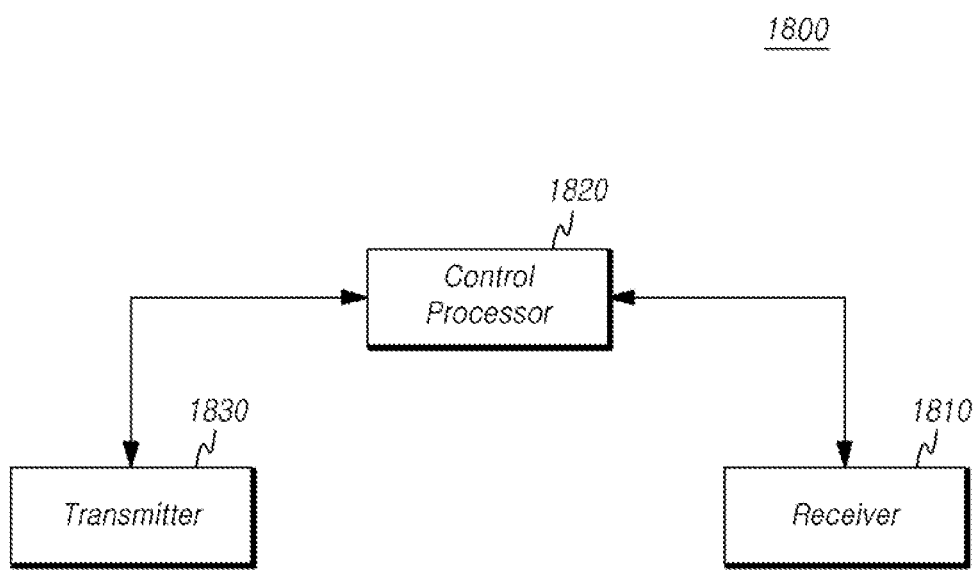
FIG. 18 is a diagram illustrating user equipment in accordance with some embodiments.

FIG. 18 is a diagram illustrating user equipment in accordance with some embodiments.

Referring to FIG. 18, user equipment 1800 according to the present embodiment may receive control information from a transmission/reception point (e.g., transmission/reception point 1700) through data regions of two or more PRB pairs in a subframe. User equipment 1800 according to the present embodiment may include receiver 1810, control processor 1820, and transmitter 1830.

Receiver 1810 may receive a wireless signal having at least one ECCE. Herein, resource elements (REs) in each of the two or more PRB pairs may be indexed by repetitively using 16 numbers (e.g., 0, 1, 2, ... , 15) according to a frequency-first scheme (i.e., a frequency first and then time manner). Resource elements (REs) having an identical index may be included in an identical EREG. Each of the at least one ECCE may include EREGs corresponding to EREG indices having an identical modulo value. More specifically, each of the at least one ECCE may be configured with (i) 4 EREGs corresponding to different EREG indices having an identical remainder (e.g., 0, 1, 2, or 3) when the different EREG indices are divided by 4, or (ii) 8 EREGs corresponding to different EREG indices having an identical remainder (e.g., 0 or 1) when the different EREG indices are divided by 2.

EREGs constituting an ECCE may be located in two or more PRB pairs. That is, EPDCCH may be transmitted according to a distributed type. More specifically, in the transmission/reception point, PRB pairs assigning ECCEs may constitute an EPDCCH set of a distributed type (i.e., a distributed EPDCCH set).

In the case that EREG indices are restricted to [0, 1, 2, ... , 15], (i) a combination of EREGs corresponding to different EREG indices having an identical remainder when the different EREG indices are divided by 4, or (ii) a combination of EREGs corresponding to different EREG indices having an identical remainder when the different EREG indices are divided by 2 may be restricted. Considering such combination, EREG indices (i.e., "an EREG index group") assigned to an ECCE may be one of {0, 4, 8, 12}, {1, 5, 9, 13}, {2, 6, 10, 14}, and {3, 7, 11, 15}. Alternatively, the EREG index group assigned to the ECCE may be one of {0, 2, 4, 6, 8, 10, 12, 14} and {1, 3, 5, 7, 9, 11, 13, 15}.

Control processor 1820 may obtain the control information from the received wireless signal. Furthermore, control processor 1820 may control operations (i.e., operations of user equipment 1800) which are required for performing the above-described present embodiments. More specifically, control processor 1820 may control operations of user equipment 1800, according to an ECCE/EREG mapping for an EPDCCH reception and/or an ECCE indexing in a certain distributed EPDCCH set.

Receiver 1810 and transmitter 1830 may respectively receive and transmit signals, messages, and/or data required for performing the above-described present embodiments, in connection with the transmission/reception point.

Although contents of technical standards referred to in the above-described embodiments are omitted for brief descriptions of the specification, the related contents of the technical standards may constitute a portion of the present specification. Accordingly, adding a portion of the standards-related content in the specification and/or the claims will be construed as being included in the scope of the present invention.

More specifically, the included documents may constitute a portion of the present specification as a portion of published documents. Accordingly, adding a portion of standards-related contents and/or standard documents in the description and/or the claims will be construed as being included in the scope of the present invention.

As described above, since the technical idea of the present invention is described by exemplary embodiments, various forms of substitutions, modifications and alterations may be made by those skilled in the art from the above description without departing from essential features of the present invention. Therefore, the embodiments disclosed in the present invention are intended to illustrate the technical idea of the present invention, and the scope of the present invention is not limited by the embodiment. The scope of the present invention shall be construed on the basis of the accompanying claims in such a manner that all of the technical ideas included within the scope equivalent to the claims belong to the present invention.

What is claimed is:

1. A method of transmitting control information to user equipment through data regions of two or more physical resource-block (PRB) pairs in a subframe, in a transmission/reception point including at least one processor, the method comprising:

forming enhanced control channel elements (ECCEs), wherein (i) resource elements (REs) in each of the two or more PRB pairs are indexed by repetitively using 16 numbers according to a frequency-first scheme, (ii) resource elements (REs) having an identical index are included in an identical enhanced resource-element group (EREG), (iii) each of the ECCEs includes 4 or 8 EREGs corresponding to different EREG indices having an identical remainder when the different EREG indices are divided by one of 4 and 2, and (iv) the EREGs included in each of the ECCEs are located in the two or more PRB pairs; and transmitting the control information to the user equipment through at least one of the formed ECCEs, wherein the forming includes:

when the number of the EREGs forming each of the ECCEs is less than the number of the PRB pairs, forming the ECCEs such that each of the ECCEs is mapped to EREGs included in at least two PRB pairs which are selected by hopping at a constant index interval.

2. The method of claim 1, wherein the constant index interval is determined based on the number of the EREGs and the number of the PRB pairs.

3. The method of claim 1, wherein the two or more PRB pairs are included in one enhanced physical downlink control channel (EPDCCH) set formed according to a distributed type scheme.

4. The method of claim 1, wherein an EREG index group corresponding to each of the ECCEs is selected as one of {0, 4, 8, 12}, {1, 5, 9, 13}, {2, 6, 10, 14}, and {3, 7, 11, 15}.

5. The method of claim 1, wherein an EREG index group corresponding to each of the ECCEs is selected as one of {0, 2, 4, 6, 8, 10, 12, 14} and {1, 3, 5, 7, 9, 11, 13, 15}.

6. A method of receiving control information from a transmission/reception point through data regions of two or more physical resource-block (PRB) pairs in a subframe, in user equipment including at least one processor, the method comprising:

receiving a wireless signal through at least one enhanced control channel element (ECCE), wherein (i) resource elements (REs) in each of the two or more PRB pairs are indexed by repetitively using 16 numbers according to a frequency-first scheme, (ii) resource elements (REs) having an identical index are included in an identical enhanced resource-element group (EREG), (iii) each of ECCEs includes 4 or 8 EREGs corresponding to different EREG indices having an identical remainder when the different EREG indices are divided by one of 4 and 2, and (iv) the EREGs included in each of the ECCEs are located in the two or more PRB pairs; and obtaining the control information from the received wireless signal, wherein when the number of the EREGs forming each of the ECCEs is less than the number of the PRB pairs, each of the ECCEs associated with reception of the wireless signal is mapped to EREGs included in at least two PRB pairs which are selected by hopping at a constant index interval.

7. The method of claim 6, wherein the constant index interval is determined based on the number of the EREGs and the number of the PRB pairs.

8. The method of claim 6, wherein the two or more PRB pairs are included in one enhanced physical downlink control channel (EPDCCH) set formed according to a distributed type scheme.

9. The method of claim 6, wherein an EREG index group corresponding to each of the ECCEs is selected as one of {0, 4, 8, 12}, {1, 5, 9, 13}, {2, 6, 10, 14}, and {3, 7, 11, 15}.

10. The method of claim 6, wherein an EREG index group corresponding to each of the ECCEs is selected as one of {0, 2, 4, 6, 8, 10, 12, 14} and {1, 3, 5, 7, 9, 11, 13, 15}.

11. A transmission/reception point for transmitting control information to user equipment through data regions of two or more physical resource-block (PRB) pairs in a subframe, the transmission/reception point comprising:

a control processor configured to form enhanced control channel elements (ECCEs), wherein (i) resource elements (REs) in each of the two or more PRB pairs are indexed by repetitively using 16 numbers according to a frequency-first scheme, (ii) resource elements (REs) having an identical index are included in an identical enhanced resource-element group (EREG), (iii) each of the ECCEs includes 4 or 8 EREGs corresponding to different EREG indices having an identical remainder when the different EREG indices are divided by one of 4 and 2, and (iv) the EREGs included in each of the ECCEs are located in the two or more PRB pairs; and a transmitter configured to transmit the control information to the user equipment through at least one of the formed ECCEs, wherein the control processor is configured to:

when the number of the EREGs forming each of the ECCEs is less than the number of the PRB pairs, form the ECCEs such that each of the ECCEs is mapped to EREGs included in at least two PRB pairs which are selected by hopping at a constant index interval.

12. The transmission/reception point of claim 11, wherein the constant index interval is determined based on the number of the EREGs and the number of the PRB pairs.

13. The transmission/reception point of claim 11, wherein the two or more PRB pairs are included in one enhanced physical downlink control channel (EPDCCH) set formed according to a distributed type scheme.

14. The transmission/reception point of claim 11, wherein an EREG index group corresponding to each of the ECCEs is selected as one of {0, 4, 8, 12}, {1, 5, 9, 13}, {2, 6, 10, 14}, and {3, 7, 11, 15}.

15. The transmission/reception point of claim 11, wherein an EREG index group corresponding to each of the ECCEs is selected as one of {0, 2, 4, 6, 8, 10, 12, 14} and {1, 3, 5, 7, 9, 11, 13, 15}.

16. A user equipment receiving control information from a transmission/reception point through data regions of two or more physical resource-block (PRB) pairs in a subframe, the user equipment comprising:

a receiver configured to receive a wireless signal through at least one enhanced control channel element (ECCE), wherein (i) resource elements (REs) in each of the two or more PRB pair are indexed by repetitively using 16 numbers according to a frequency-first scheme, (ii) resource elements (REs) having an identical index are included in an identical enhanced resource-element group (EREG), (iii) each of ECCEs includes 4 or 8 EREGs corresponding to different EREG indices having an identical remainder when the different EREG indices are divided by one of 4 and 2, and (iv) the EREGs included in each of the ECCEs are located in the two or more PRB pairs; and a control processor configured to obtain the control information from the received wireless signal, wherein when the number of the EREGs forming each of the ECCEs is less than the number of the PRB pairs, each of the ECCEs associated with reception of the wireless signal is mapped to EREGs included in at least two PRB pairs which are selected by hopping at a constant index interval.

17. The user equipment of claim 16, wherein the constant index interval is determined based on the number of the EREGs and the number of the PRB pairs.

18. The user equipment of claim 16, wherein the two or more PRB pairs are included in one enhanced physical downlink control channel (EPDCCH) set formed according to a distributed type scheme.

19. The user equipment of claim 16, wherein an EREG index group corresponding to each of the ECCEs is selected as one of {0, 4, 8, 12}, {1, 5, 9, 13}, {2, 6, 10, 14}, and {3, 7, 11, 15}.

20. The user equipment of claim 16, wherein an EREG index group corresponding to each of the ECCEs is selected as one of {0, 2, 4, 6, 8, 10, 12, 14} and {1, 3, 5, 7, 9, 11, 13, 15}.

* * * * *